(12) United States Patent
Uchimura

(10) Patent No.: US 8,730,304 B2
(45) Date of Patent: May 20, 2014

(54) INFORMATION PROCESSING APPARATUS, METHOD, PROGRAM AND RECORDING MEDIUM

(75) Inventor: Kouichi Uchimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 568 days.

(21) Appl. No.: 13/002,742

(22) PCT Filed: Apr. 30, 2010

(86) PCT No.: PCT/JP2010/057649
§ 371 (c)(1),
(2), (4) Date: Jan. 5, 2011

(87) PCT Pub. No.: WO2010/131584
PCT Pub. Date: Nov. 18, 2010

(65) Prior Publication Data
US 2011/0115884 A1 May 19, 2011

(30) Foreign Application Priority Data

May 12, 2009 (JP) ................................ 2009-115149
Jul. 17, 2009 (JP) ................................ 2009-168806
Apr. 21, 2010 (JP) ................................ 2010-098082

(51) Int. Cl.
*H04N 13/02* (2006.01)
(52) U.S. Cl.
USPC ............................................. 348/46; 348/42
(58) Field of Classification Search
USPC .................... 386/69, 239, 125; 348/42, 46
See application file for complete search history.

(56) References Cited

U.S. PATENT DOCUMENTS

| | | | | |
|---|---|---|---|---|
| 6,078,727 | A * | 6/2000 | Saeki et al. | 386/351 |
| 6,373,484 | B1 | 4/2002 | Orell et al. | |
| 7,305,167 | B2 | 12/2007 | Hutchinson | |
| 8,306,387 | B2 * | 11/2012 | Yamashita et al. | 386/239 |
| 2004/0234239 | A1 * | 11/2004 | Seo et al. | 386/69 |
| 2008/0018731 | A1 | 1/2008 | Era | |

FOREIGN PATENT DOCUMENTS

| | | |
|---|---|---|
| EP | 2 293 553 A1 | 3/2011 |
| JP | 2004 104742 | 4/2004 |
| JP | 2004-274125 A | 9/2004 |

(Continued)

OTHER PUBLICATIONS

Extended Search Report issued Apr. 18, 2013 in European Patent Application No. 10774842.8.

(Continued)

*Primary Examiner* — Allen Wong
(74) *Attorney, Agent, or Firm* — Oblon, Spivak, McClelland, Maier & Neustadt, L.L.P.

(57) ABSTRACT

A data structure, recording medium, playing device, playing method, program, and program storing medium, which enable providing of a video format for 3D display, suitable for 3D display of captions and menu buttons. Caption data used for 2D display of caption and menu data used for 2D display of menu buttons are recorded in a disc as is a database of offset information, in which is described offset information, made up of offset direction representing the direction of shifting of an image for the left eye and an image for the right eye used for 3D display as to images for 2D display regarding the caption data and menu data, and an offset value representing the amount of shifting, correlated with the playing point-in-time of caption data and menu data, respectively.

3 Claims, 29 Drawing Sheets

(56) References Cited

FOREIGN PATENT DOCUMENTS

| | | |
|---|---|---|
| JP | 2006 87081 | 3/2006 |
| JP | 2009-066885 | 3/2009 |
| JP | 2009-135686 A | 6/2009 |
| JP | 2010-510558 A | 4/2010 |
| JP | 4564107 B2 | 10/2010 |
| JP | 4574748 B2 | 11/2010 |
| JP | 4588120 B2 | 11/2010 |
| JP | 4792127 B2 | 10/2011 |
| WO | 2008 044191 | 4/2008 |
| WO | WO 2008/115222 A1 | 9/2008 |

OTHER PUBLICATIONS

Search Report and Written Opinion issued May 16, 2013 in Singaporean Patent Application No. 201100020-5.

* cited by examiner

Title NO.      TYPE AND NO. OF OBJECT TO EXECUTE

| First Play | MovieObject#1 |
|---|---|
| Top menu | MovieObject#2 |
| Title#1 | BD-J Object#1 |
| ... | ... |
| Title#N | MovieObject#M |

FIG. 3

| POINT-IN-TIME OF PLAYING | OFFSET DIRECTION | OFFSET VALUE | PLANE |
|---|---|---|---|
| 00:00:14 | NEAR SIDE | 32 | PG |
| 00:00:16 | NEAR SIDE | 24 | IG |
| ... | | | |

FIG. 4

```
xxxxx.mpls {
   ...
   AppInfoPlayList()
   PlayList()
   PlayListMark()
   ExtensionData()
   ...
}
```

```
ExtensionData() {
   ...
   number_of_ext_data_entries
   for() {
      ext_data_entry()
   }
   ...
   data_block()
}
```

```
ext_data_entry() {
   ID1 = 0x0001
   ID2 = 0x0003
   ...
}
```

```
offset_metadata() {
   length
   number_of_metadata_block_entries
   for(int i = 0; i< number of metadata_block_entries
   i++) {
      ref_to_PlayItem_id[i]
      stream_type[i]
      ref_to_stream_id[i]
      reserved_for_future_use
      number_of_offset_metadata[i]
      for(int j = 0; j< number_of_offset_metadata;
      j++) {
         offset_pts[j]
         offset_flag[j]
         offset_value[j]
         reserved_for_future_use
      }
   }
}
```

FIG. 5

```
data_block()
{
  offset_metadata() {
    length                                             32bits  length of this offset_metadata()
    number_of_metadata_block_entries                   16bits
    for(int i=0;i<number of metadata_block_entries
      i++){
      ref_to_PlayItem_id[i]                            16bits  playitem_id which is referred by this metadata
      plane_identifier[i]                              1bit    0:IG plane 1:PG plane
      reserved_for_word_align                          7bits
      ref_to_stream_id[i]                              8bits   stream_id(if BDJ == 0xFF)
      reserved_for_future_use                          16bits
      number_of_offset_metadata[i]                     16bits
      for(int j=0;j<number_of_offset_metadata;
        j++){
        offset_pts[j]                                  32bits  time_stamp
        offset_flag[j]                                 1bit    offset direction
        offset_value[j]                                7bits   actual value
        reserved_for_word_align                        8bits
        reserved_for_future_use                        16bits
      }
    }
    reserved_for_future_use                            16bits
  }
}
```

FIG. 10

| Syntax | No. of bits | Mnemonic |
|---|---|---|
| offset_matadata() { | | |
|   length | 32 | uimsbf |
|   for(i=0;i<number_of_playitem;i++) { | | |
|     number_of_Plane_offsets[i] | 16 | uimsbf |
|     for(j=0;j<number_of_Plane_offsets[i];j++) { | | |
|       Plane_offset_pts[j] | 32 | uimsbf |
|       is_IG_Offsets | 1 | bslbf |
|       if(is_IG_Offsets==1b) { | | |
|         IG_Plane_offset_direction[j] | 1 | bslbf |
|         IG_Plane_offset_value[j] | 6 | uimsbf |
|         IG_Plane_sub_offset_rate[j] | 5 | uimsbf |
|         number_of_IG_Plane_sub_offsets[j] | 5 | uimsbf |
|         for(k=0;k<number_of_IG_Plane_sub_offsets[j];k++) { | | |
|           IG_Plane_sub_offset_direction[k] | 1 | bslbf |
|           IG_Plane_sub_value[k] | 6 | uimsbf |
|         } | | |
|       } | | |
|       is_PG_Offsets | 1 | bslbf |
|       if(is_PG_Offsets==1b) { | | |
|         PG_Plane_offset_direction[j] | 1 | bslbf |
|         PG_Plane_offset_value[j] | 6 | uimsbf |
|         PG_Plane_sub_offset_rate[j] | 5 | uimsbf |
|         number_of_PG_Plane_sub_offsets[j] | 5 | uimsbf |
|         for(k=0;k<number_of_PG_Plane_sub_offsets[j];k++) { | | |
|           PG_Plane_sub_offset_direction[k] | 1 | bslbf |
|           PG_Plane_sub_value[k] | 6 | uimsbf |
|         } | | |
|       } | | |
|     } | | |
|   } | | |
| } | | |

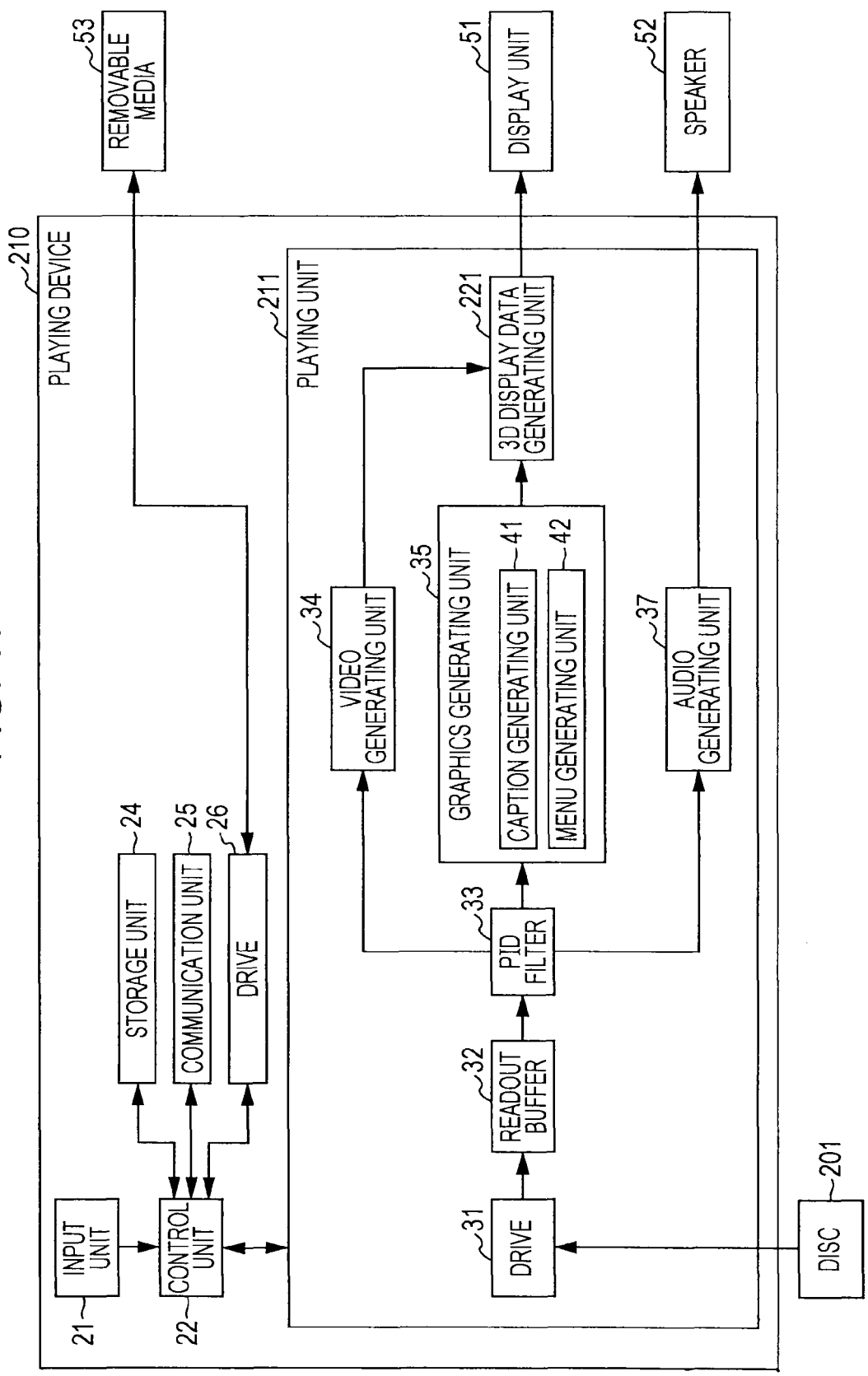

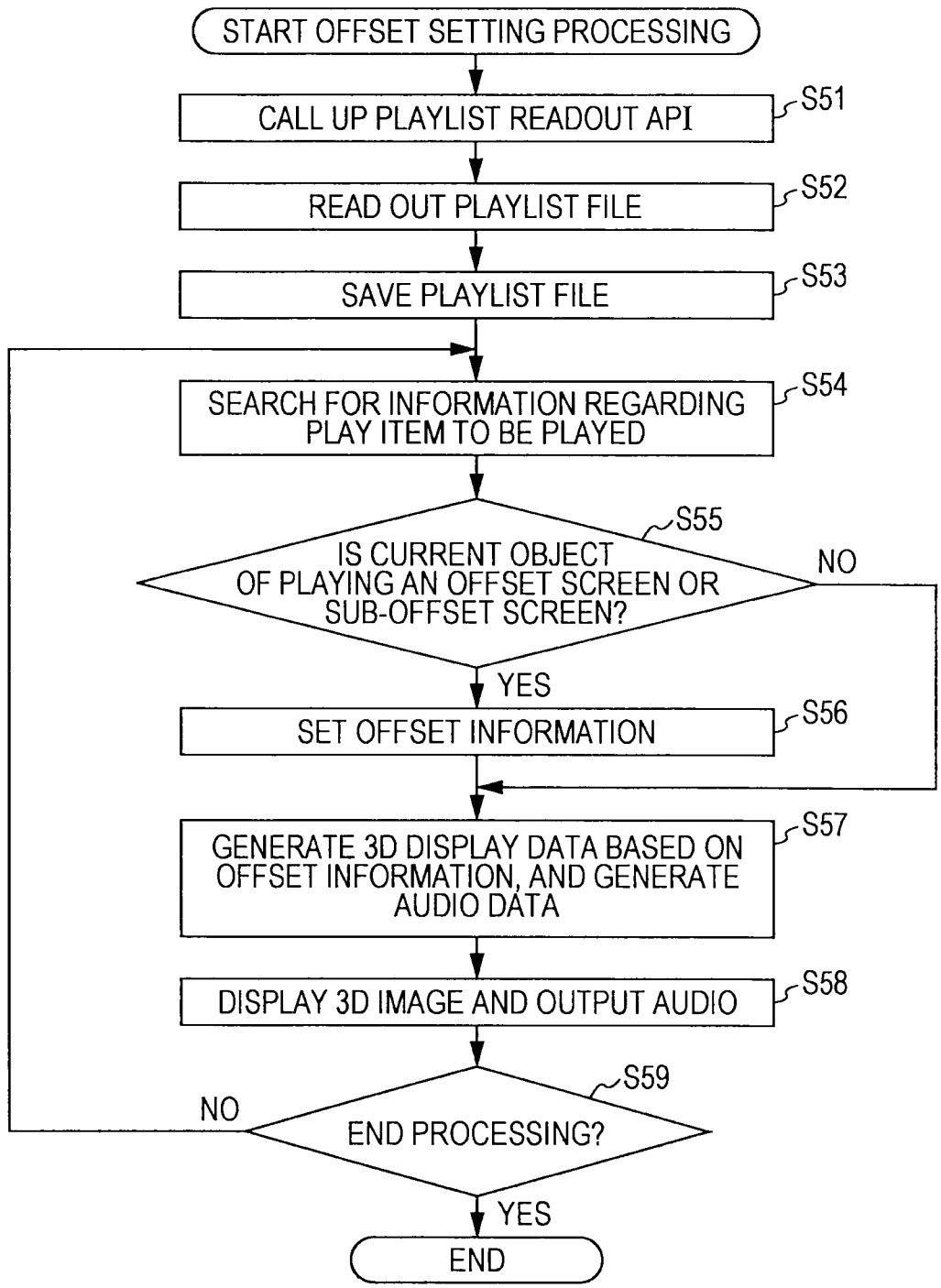

FIG. 14

| Syntax | No. of bits | Mnemonic |
|---|---|---|
| offset_matadata() { | | |
|   length | 32 | uimsbf |
|   number_of_offsets_id | 4 | uimsbf |
|   reserved_for_future_use | 12 | bslbf |
|   for(offset_id=1;offset_id<=number_of_offset_id;i++) { | | |
|     for(i=0;i<number_of_playitem;i++) { | | |
|       number_of_offsets[i] | 16 | uimsbf |
|       for(j=0;j<number_of_offsets[i];j++) { | | |
|         offset_pts[j] | 32 | uimsbf |
|         offset_direction[j] | 1 | bslbf |
|         offset_value[j] | 6 | uimsbf |
|         sub_offset_rate[j] | 5 | uimsbf |
|         number_of_sub_offsets[j] | 5 | uimsbf |
|         for(k=0;k<number_of_sub_offsets[j];k++) { | | |
|           sub_offset_direction[k] | 1 | bslbf |
|           sub_offset_value[k] | 6 | uimsbf |
|         } | | |
|       } | | |
|     } | | |
|   } | | |
|   padding_word | n1 | bslbf |
| } | | |

FIG. 25

A
```
Syntax
offset_metadata() {
    frame_rate
    offset_start_PTS
    number_of_frames
    number_of_PG_offset_sequences
    number_of_IG_offset_sequences
    for (int i=0;
        i<number_of_PG_offset_sequences;
        i++) {
        PG_offset_sequence ()
    }
    for (int i=0;
        i<number_of_IG_offset_sequences;
        i++) {
        IG_offset_sequence ()
    }
}
```

B
```
Syntax
PG_Offset_sequence() {
    for (i=0;
        i<number_of_frames;
        i++) {
        offset_direction_flag
        offset_value
    }
}
```

C
```
Syntax
IG_Offset_sequence() {
    for (i=0;
        i<number_of_frames;
        i++) {
        offset_direction_flag
        offset_value
    }
}
```

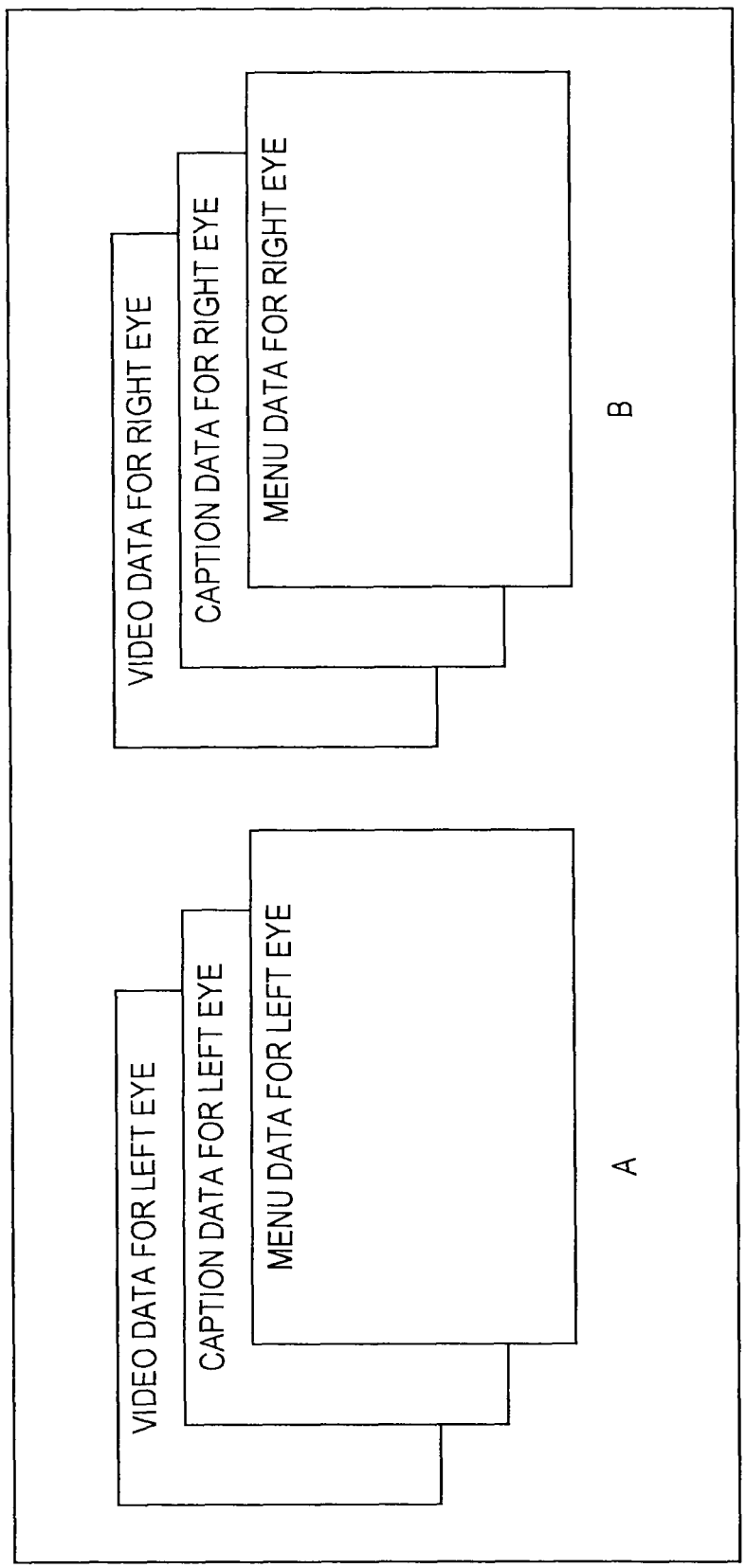

INFORMATION PROCESSING APPARATUS, METHOD, PROGRAM AND RECORDING MEDIUM

TECHNICAL FIELD

The present invention relates to a data structure and recording medium, a playing device, a playing method, a program, and a program storing medium, and more particularly relates to a data structure and recording medium, a playing device, a playing method, a program, and a program storing medium which enable providing of a video format for 3D display, suitable for 3D display of captions and menu buttons.

BACKGROUND ART

There are various types of displays having 3D (3 Dimensional) image display functions (hereinafter, 3D displays). Also, there are various types of video formats for 3D display (hereinafter called 3D video formats).

3D video formats include a method using images of three or more viewpoints (Multi-views), specifically for example, a 3D video format using 2-dimensional images and Depth images suitable of 3D display in a so-called lenticular method, and so forth.

Now, as a disc-type recording medium for recording data such as images and the like, there are play-only optical discs conforming to the Blu-ray Disc (registered trademark) standard. With this standard, captions are displayed on a plane separate from the plane on which moving images are displayed, and the caption and moving images are overlaid and displayed by the caption plane and moving image plane being synthesized. For example, one screen of image data wherein a caption is displayed on a moving image is generated by providing portions of a caption plane other than the caption with a transparent attribute, and the positioning the caption plane in front of the moving image plane. PTL 1 describes a technique wherein a moving image plane and caption plane are both provided based on the Blu-ray Disc standard which is a recoding/playing standard, and moving images according to video data and captions according to caption image data are displayed on one screen.

CITATION LIST

Patent Literature

PTL 1: Japanese Unexamined Patent Application

SUMMARY OF INVENTION

Technical Problem

However, as of current, there is no video format for 3D display suitable for 3D display of captions and menu buttons.

The present invention has been made in light of the current situation, and it is an object thereof to enable providing of a video format for 3D display, suitable for 3D display of captions and menu buttons.

Solution to Problem

A data structure or a recording medium according to one aspect of the present invention is a data structure or a recording medium in which is recorded data of the data structure including: image data used for 2D (2 Dimensional) display of a sub-image made up of a caption or menu button; and a table in which is described, with regard to the sub-image corresponding to the image data, offset information which is made up of an offset direction representing the direction of shift of an L image for the left eye and R image for the right eye, used for 3D display of the sub-image, and an offset value representing the amount of shift, in a manner correlated with the playing point-in-time of the sub-image.

With the data structure or a recording medium in which is recorded data of the data structure according to the first aspect of the present invention, image data used for 2D (2 Dimensional) display of a sub-image made up of a caption or menu button, and a table in which is described, with regard to the sub-image corresponding to the image data, offset information which is made up of an offset direction representing the direction of shift of an L image for the left eye and R image for the right eye, used for 3D display of the sub-image, and an offset value representing the amount of shift, in a manner correlated with the playing point-in-time of the sub-image, are included A playing device according to an aspect of the present invention is a playing device which, in the event of playing data of a data structure including image data used for 2D (2 Dimensional) display of a sub-image made up of a caption or menu button, and a table in which is described, with regard to the sub-image corresponding to the image data, offset information which is made up of an offset direction representing the direction of shift of an L image for the left eye and R image for the right eye, used for 3D display of the sub-image, and an offset value representing the amount of shift, in a manner correlated with the playing point-in-time of the sub-image; reads out and holds the table included in the data; reads out the image data included in the data; and in the event that the playing point-in-time of the image data is the playing point-in-time included in the table, generates and outputs image data of the L image and the R image from that image data, based on offset information described corresponding to that playing point-in-time.

A playing method, program, and program storing medium according to an aspect of the present invention, correspond to the above-described aspect of the present invention.

With the playing device, playing method, program, and program storing medium, according to an aspect of the present invention, data of a data structure including image data used for 2D (2 Dimensional) display of a sub-image made up of a caption or menu button, and a table in which is described, with regard to the sub-image corresponding to the image data, offset information which is made up of an offset direction representing the direction of shift of an L image for the left eye and R image for the right eye, used for 3D display of the sub-image, and an offset value representing the amount of shift, in a manner correlated with the playing point-in-time of the sub-image, is played as follows. That is to say, the table included in the data is read out and held. Also, the image data included in the data is read out. In the event that the playing point-in-time of the image data is the playing point-in-time included in the table, image data of the L image and the R image from that image data is generated and output, based on offset information described corresponding to that playing point-in-time.

Advantageous Effects of Invention

According to the present invention, 3D display of captions and menu buttons can be performed. Also, a video format for 3D display, suitable for 3D display of captions and menu buttons, can be provided.

BRIEF DESCRIPTION OF DRAWINGS

FIG. 3 is a diagram conceptually illustrating a database of offset information.

FIG. 4 is a diagram illustrating a description example of a playlist file.

FIG. 5 is a diagram illustrating a detailed description example of data_block.

FIG. 10 is a diagram illustrating a detailed description example of "offset_metadata ( )" in a second embodiment of a disc to which the present invention has been applied.

FIG. 11 is a block diagram illustrating a configuration example of a playing device.

FIG. 13 is a flowchart for describing offset setting processing with the playing device when executing a BD-J object.

FIG. 14 is a diagram illustrating a detailed description example of "offset_metadata ( )" in a third embodiment of a disc to which the present invention has been applied.

FIG. 25 is a diagram illustrating a description example of "offset_metadata ( )".

FIG. 30 is a diagram for describing a method for generating 3D display data.

DESCRIPTION OF EMBODIMENTS

First Embodiment

Configuration Example of Disc

Figures 1, 2:
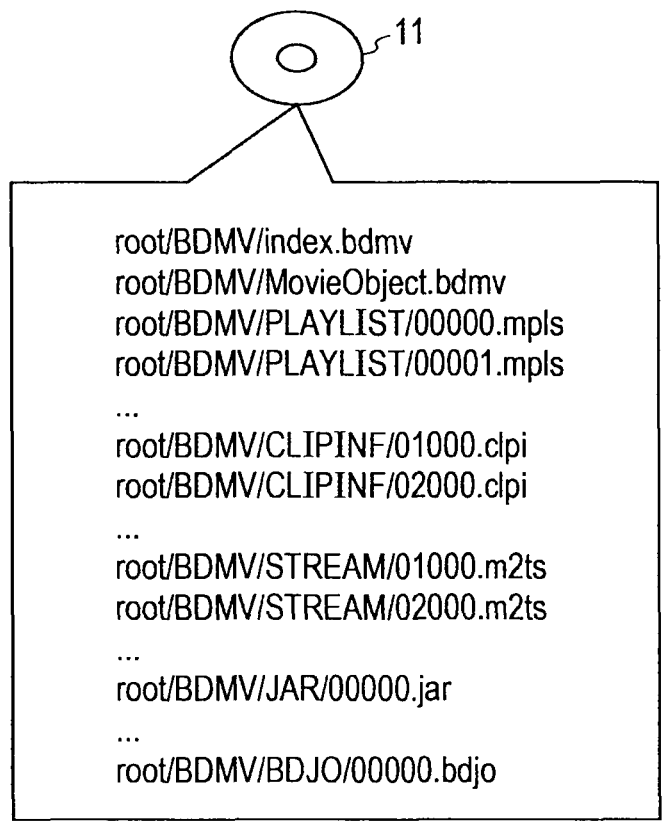
FIG. 1 is a diagram illustrating a configuration example of a first embodiment of a disc to which the present invention has been applied.
FIG. 2 is a diagram illustrating a detailed configuration example of an index file.

FIG. 1 is a diagram illustrating a configuration example of a first embodiment of a disc to which the present invention has been applied.

A disc 11 in FIG. 1 is configured of BD-ROM (Blue-ray Disc-Read Only Memory) and so forth, with an index file (index.bdmv) and movie object file (MovieObject.bdmv) being recorded in the disc 11. Also recorded in the disc 11 are a playlist file (PLAYLIST/XXXXX.mpls), clip information file (CLIPINF/XXXXX.clpi), stream file (STREAM/XXXXX.m2ts), and so forth. Further, recorded in the disc 11 is a BD-J object file (BDJO/XXXXX.bdjo), a related file thereof (JAR/XXXXX.jar), and so forth. Note that X is an arbitrary numeral from 0 to 9.

As shown in FIG. 2, described in an index file are, for example, a list of title Nos. recorded in the disc 11, and types and Nos. of objects executed corresponding to the title Nos.

Title Nos. described are not just integer values provided in order from 1, but also "First Play" corresponding to an object executed when the disc 11 is inserted into a playing device. Also described is "Top Menu" corresponding to an object executed when displaying a top menu screen. As for types of objects, there are the two types of movie object (MovieObject) and BD-J object (BD-J Object).

In the example shown in FIG. 2, "MovieObject#1", "MovieObject#2", and "MovieObject#M", are described in the index file corresponding to "First Play", "Top menu", and "Title#N", respectively. Also, "BD-J Object#1" is described corresponding to "Title#1".

Note that MovieObject#i and BD-J Object#i each have as the type of object thereof a movie object and a BD-J object, with i representing the No. of the object. Also, Title#i represents that the No. of the tile is i. Such an index file is also called an index table.

Multiple movie objects are described in a movie object file, and commands (navigation commands) are described in the movie objects. The playing device which plays the disc 11 sequentially executes these commands.

A playlist file is a file played only by a movie object or BD-J object, and information relating to an AV stream (described in detail later) played with these objects is described therein.

Specifically, a playlist file is configured of multiple play items, a database of offset information (described in detail later) necessary for generating images for 3D display from images for 2D display, and so forth. Each play item has described therein information specifying a clip information file corresponding to the AV stream to be played, and time information representing the playing section of the AV stream. Details of the offset information database will be described with reference to FIG. 3 and others to be described later.

Now, an AV stream is configured of TS (Transport Stream) packets of video data in which video data for performing 2D display of main images such as movies has been encoded confirming to MPEG2, MPEG-4 AVC (Advanced Video Coding), VC1, or the like, and multiplexed confirming to ISO 13818-2, and audio data corresponding thereto, caption data for performing 2D display of caption as sub-images, and menu data for performing 2D display of menu buttons as sub-images.

Also, offset information is made up of offset direction indicating the direction of offset of the images for the left eye and for the right eye, for 3D display as to images for 2D display, and an offset value indicating the amount of offset. Note that the offset direction for the left eye and the offset direction for the right eye are opposite directions. Offset values are expressed in terms of number of pixels, for example.

A clip information file has described therein a map correlating the time information described in the playlist file and packet Nos. of the AV stream. Accordingly, the playing device can recognize the packet No. of the AV stream to be played, corresponding to each play item, by referencing the clip information file.

A stream file is file of an AV stream.

Multiple BD-J applications are described in a BD-J object file. A playing device for playing the disc 11 calls up these BD-J applications.

[Description of Database of Offset Information]

FIG. 3 is a diagram conceptually illustrating a database of offset information.

As shown in FIG. 3, for a database of offset information, a table is described of offset information in increments of screens regarding caption data and menu data for each playing point-in-time.

Specifically, offset direction and offset value serving as offset information are described in the database of offset information correlated to the playing point-in-time of the screen in which this offset information is set, and caption (PG) or menu button (IG) as the type of this screen.

Description Example of Playlist File

FIG. 4 is a diagram illustrating a description example of a playlist file in the disc 11.

As shown in FIG. 4, with the playlist file in the disc 11, numerical values are described indicating that an offset information database is described in "data_block", as "ID1" and "ID2" of "ext_data_entry" of "ExtensionData". In the example in FIG. 4, "0x0001" is described as "ID1", and "0x0003" is described as "ID2".

Also, the offset information database is described in "data_block". A detailed description example of this "data_block" will be described in detail with reference to the later-described FIG. 5.

Description Example of Data_Block

FIG. 5 is a diagram illustrating a detailed description example of "data_block".

The left side of FIG. 5 illustrates a description example of "data_block", and the right side illustrates the meaning of the description.

As shown in FIG. 5, "data_block" has "offset_metadata ( )" situated thereunder, and the offset information database is described in this "offset_metadata ( )".

In detail, 32-bit information indicating the length of "offset_metadata ( )" (length), 16-bit information indicating the number of "metadata_block_entry" situated in "offset_metadata ( )" (number_of_metadata_block_entries), "metadata_block_entry", and 16-bit empty region (reserved_for_future_use), are provided.

Situated in "metadata_block_entry" are the ID of the play item to be referred, i.e., 16-bit information representing the ID of the play item corresponding to the screen regarding which the offset information is set (ref_to_PlayItem_id). Also situated in "metadata_block_entry" is 1-bit information indicating the type of screen regarding which the offset information is set (plane_identifier). In the example in FIG. 5, in the event that the type of screen regarding which the offset information is set is menu button (IG), "0" is set, and in the event of caption (PG), "1" is set.

Situated in "metadata_block_entry" are a 7-bit empty region for bit alignment (reserved_for_word_align), and 8-bit information representing the ID of the AV stream to reference, i.e., the ID of the AV stream corresponding to the screen regarding which the offset information is set (ref_to_stream_id). Note however, that while executing a BD-J object, no menu button screen is generated by the AV stream, so no ID of an AV stream to reference exists. Accordingly, information (ref_to_stream_id) as to the offset information set to the screen of the menu button when executing a BD-J object is described as a numerical value indicating that the offset information is to be set when a BD-J object is being executed ("0xFF" in the example in FIG. 5).

Also, situated in "metadata_block_entry" are a 16-bit empty region (reserved_for_future_use), 16-bit information representing the number of "offset_metadata" situated within "metadata_block_entry" (number_of_offset_metadata), and "offset_metadata".

Situated in "offset_metadata" are 32-bit information representing the playing point-in-time of the screen regarding which offset information is set (offset_pts), and 1-bit information indicating of the offset information, the offset direction (offset_flag). As for information representing the offset direction, for example, "0" is used in the case of the offset direction causing the 3D image to protrude toward the near side (user side), and "1" is used in the event of causing the 3D image to retract toward the far side.

Also, situated in the "offset_metadata" is 7-bit information representing the offset value (offset_value), an 8-bit empty region for bit alignment, and a 16-bit empty region.

Note that while with the example in FIG. 5, the 1-bit information (plane_identifier) representing the type of screen regarding which offset information is set has been situated in the "offset_metadata ( )", this information does not have to be provided. In this case, the description position within the offset information database for each of caption data and menu data is described in the playlist file.

Configuration Example of Playing Device

Figure 6:
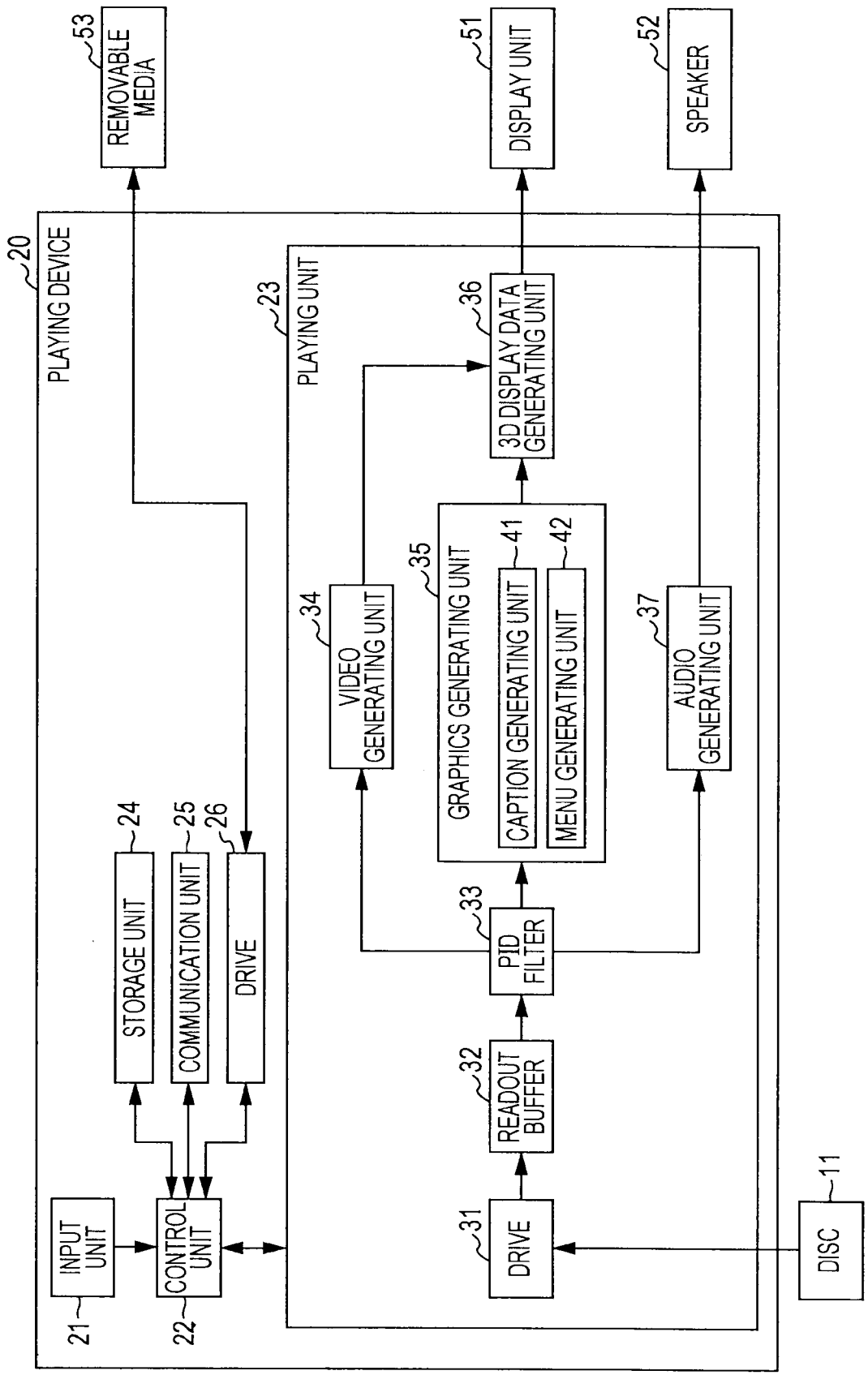
FIG. 6 is a block diagram illustrating a detailed configuration example of a playing device for playing the disc in FIG. 1.

FIG. 6 is a block diagram illustrating a configuration example of a playing device 20 for playing the above-described disc 11.

The playing device 20 shown in FIG. 6 is configured of an input unit 21, control unit 22, playing unit 23, storage unit 24, communication unit 25, and drive 26.

The input unit 21 is made up of a keyboard, mouse, microphone, and so forth. The input unit 21 accepts instructions from the user, which are supplied to the control unit 22. The control unit 22 controls the playing unit 23 in accordance with the instructions from the input unit 21 by executing a predetermined program. For example, the control unit 22 supplies a playlist file recorded in the disc 11 to a 3D display data generating unit 36, in accordance with commands for 3D playing of the disc 11 from the input unit 21.

The playing unit 23 is made up of a drive 31, a readout buffer 32, a PID filter 33, a 3D video generating unit 34, a 3D graphics generating unit 35, the 3D display data generating unit 36, and an audio generating unit 37.

The drive 31 drives the disc 11 that has been mounted, under control of the control unit 22. Accordingly, the drive 31 reads out index files, playlist files, stream files, and so forth, recorded in the disc 11. The drive 31 supplies the index files and playlist files and the like that have been read out to the control unit 22. The drive 31 supplies the AV streams serving as stream files that have been read out to the readout buffer 32.

Under control of the control unit 22, the readout buffer 32 holds the AV streams supplied from the drive 31, reads out the AV streams being held so as to be supplied to the PID filter 33, and so forth.

The PID filter 33 extracts the packets for each of the video data, caption data, menu data, and audio data, included in the AV stream, based on the packet ID (PID) of the packets of the AV stream from the readout buffer 32. Note that a PID is an ID unique for each type of data making up a packet, and is added to the packet.

The PID filter 33 extracts PES (Packetized Elementary Stream) packets from each of the extracted packets for each of the video data, caption data, menu data, and audio data. The PID filter 33 then supplies the PES packets of the video data to the video generating unit 34, and supplies the PES packets of the caption data and menu data to the graphics generating unit 35. The PID filter 33 also supplies the PES packets of the audio data to the audio generating unit 37.

The video generating unit 34 decodes the PES packets of video data supplied from the PID filter 33, and supplies video data generated as the result thereof to the 3D display data generating unit 36.

The graphics generating unit 35 is configured of a caption generating unit 41 and menu generating unit 42. The caption generating unit 41 generates caption data using the PES packets for caption data supplied from the PID filter 33, and supplies this to the 3D display data generating unit 36.

The menu generating unit 42 generates menu data using the PES packets for menu data supplied from the PID filter 33, while a movie object is being executed, and ignores the menu data PES packets and generates menu data under control of the control unit 22 while a BD-J object is being executed. The menu generating unit 42 then supplies the generated menu data to the 3D display data generating unit 36.

The 3D display data generating unit 36 holds playlist files supplied from the control unit 22 in built-in memory (not shown). Also, the 3D display data generating unit 36 generates image data for the left eye and image data for the right eye, from the video data supplied from the video generating unit 34 and the caption data and menu data supplied from the graphics generating unit 35.

Specifically, the 3D display data generating unit 36 generates image data obtained as the result of shifting a main image corresponding to video data in one direction of the left and right directions by a predetermined offset value, in increments of screens, as video data for the left eye, and generates image data obtained as the result of shifting in the other direction as video data for the right eye.

Also, the 3D display data generating unit 36 searches for offset information corresponding to the playing point-in-time of the caption data to be played, from the "offset_metadata ( )" within the playlist file held in the built-in memory, and generates caption data for the left eye and for the right eye based on that offset information. In the same way, generates menu data for the left eye and for the right eye based on the offset information within the "offset_metadata ( )" within the playlist file.

The 3D display data generating unit 36 synthesizes the video data, caption data, and menu data for the left eye and right eye that has been generated in this way, by data for each eye. The 3D display data generating unit 36 supplies the display data for the left eye and the display data for the right eye obtained as a result thereof, to the display unit 51 as 3D display data.

The audio generating unit 37 decodes PES packets of audio data supplied from the PID filter 33, and supplies audio data obtained as a result thereof to a speaker 52.

The display unit 51 is configured of a 3D display and so forth. The display unit 51 performs output based on the 3D display data supplied from the 3D display data generating unit 36. As a result the user can view 3D images.

The speaker 52 outputs audio corresponding to the audio data supplied from the audio generating unit 37.

The storage unit 24 is configured of ROM (Read Only Memory), RAM (Random Access Memory), a hard disk, or the like. The storage unit 24 stores program to be executed by the control unit 22, information generated by processing by the control unit 22, and so forth. The communication unit 25 is configured of a network card or the like.

Note that the programs executed by the control unit 22 may be stored in the ROM of the storage unit 24, or may be recorded in removable media 53 mounted to the hard disk of the storage unit 24 or the drive 26, and loaded to the RAM of the storage unit 24 and executed.

Examples of removable media 53 include flexible disks, CD-ROM (Compact Disc Read Only Memory), MO (Magneto Optical) discs, DVD (Digital Versatile Disc), magnetic disks, semiconductor memory, and so forth.

Also, the program executed by the control unit 22 may be installed to the playing device 20 from removable media 53 such as described above, or may be downloaded to the playing device 20 via a communication network or broadcast network, and installed in the hard disk of the storage unit 24. That is to say, the program may be wirelessly transferred to the playing device 20 via a digital satellite broadcasting satellite, or transferred to the playing device 20 by cable via a network such as a LAN (Local Area Network) or the Internet, from a download site, for example.

Functional Configuration Example of Playing Device

Figure 7:
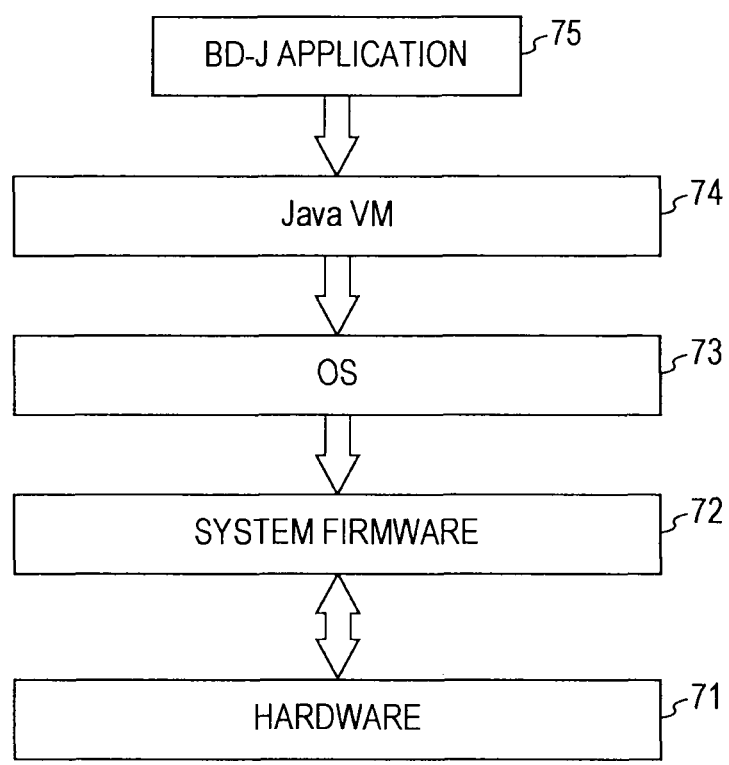
FIG. 7 is a diagram illustrating an example of a function configuration of the playing device when executing a BD-J object.

FIG. 7 is a diagram illustrating a functional configuration example of the playing device 20 when executing a BD-J object.

Hardware 71 corresponds to the input unit 21, playing unit 23, storage unit 24, and so forth. Also, system firmware 72, OS (Operating System) 73, Java (registered trademark) VM 74, and BD-J application 75 correspond to the control unit 22.

Upon a disc 11 being mounted to the hardware 71, the system firmware 72 controls the hardware 71 so as to read out the index file from the disc 11. The system firmware 72 then stores the index file in the hardware 71.

Also, the system firmware 72 reads out the index file from the hardware 71, and recognizes an object type and No. corresponding to a title No. to be processed, that is described within the index file. In the example in FIG. 7, the type of this object is a BD-J object.

The system firmware 72 controls the hardware 71 based on the No. of the BD-J object corresponding to the title No. to be processed, so as to read out the BD-J object to be processed from the disc 11, which is then stored in the hardware 71. After recognizing the BD-J application 75 to be executed based on that BD-J object, the system firmware 72 activates the Java (registered trademark) VM 74. The system firmware 72 then loads the BD-J application 75 to the Java (registered trademark) VM 74. Note that an arrangement may be made wherein the Java (registered trademark) VM 74 is activated in the time between after the disc 11 being mounted to the hardware 71 up to the BD-J application 75 to be executed being recognized.

Also, the system firmware 72 controls the hardware 71 in response to a playlist readout function call-up from the OS (Operating System) 73 corresponding to an API for readout of the playlist file by the BD-J application 75 (hereinafter referred to as playlist call-up API) so as to read out the playlist file from the disc 11 and store it.

Based on the function notified from the Java (registered trademark) VM 74, the OS 73 performs a function call-up as to the system firmware 72 corresponding to that function. For example, based on a playlist readout function notified from the Java (registered trademark) VM 74 in accordance with the playlist readout API call-up from the BD-J application 75, the OS 73 performs call-up of the playlist readout function as to the system firmware 72 corresponding to that playlist readout function.

The Java (registered trademark) VM 74 interprets functions corresponding to the API (Application Program Interface) that has been called up by the BD-J application 75, and notifies this to the OS 73. For example, the Java (registered trademark) VM 74 interprets the function corresponding to the playlist readout API that has been read out by the BD-J application 75, and makes notification to the OS 73 of the playlist readout function.

The BD-J application 75 performs call-up of an API stipulated by the Java (registered trademark) VM 74, as to the Java (registered trademark) VM 74. For example, the BD-J application 75 performs call-up of a playlist readout API as to the Java (registered trademark) VM 74.

[Processing of Playing Device]

Figure 8:
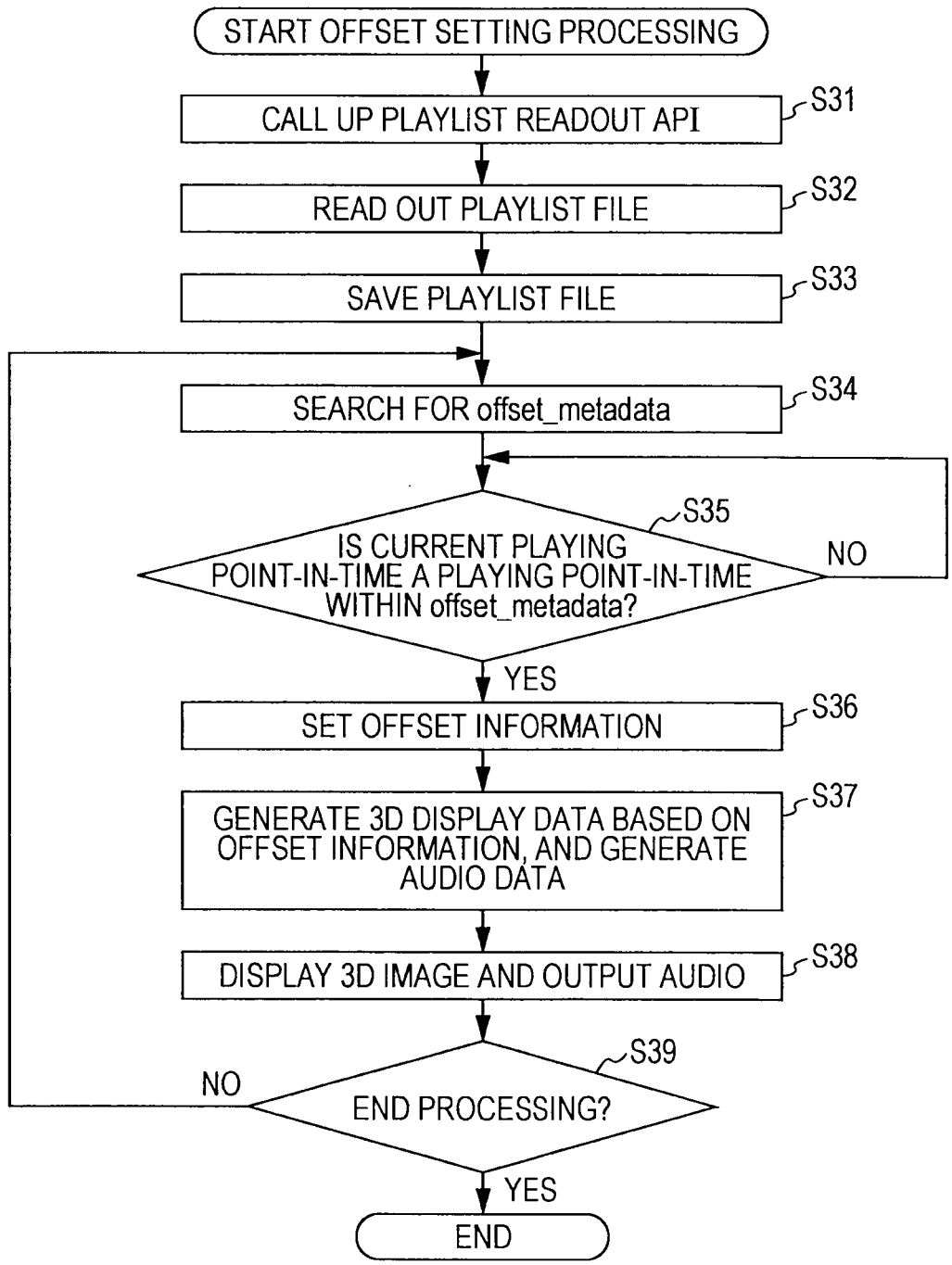
FIG. 8 is a flowchart for describing offset setting processing with the playing device when executing a BD-J object.

FIG. 8 is a flowchart for describing offset setting processing by the playing device 20 at the time of executing a BD-J object. This offset setting processing is started when the system firmware 72 loads the BD-J application 75 which sets the offset information to the Java (registered trademark) VM 74, for example.

In step S31, the BD-J application 75 performs call-up of the playlist readout API as to the Java (registered trademark) VM 74. Accordingly, the Java (registered trademark) VM 74 recognizes the playlist readout function as a function corresponding to the playlist readout API, and makes notification to the OS 73. The OS 73 performs call-up of the playlist readout function as to the system firmware 72 corresponding to the playlist readout function.

In step S32, the system firmware 72 controls the hardware 71 to read out the playlist file from the disc 11.

In step S33, the system firmware 72 saves the playlist file that has been read out, to the hardware 71.

In step S34, the hardware 71 searches for the "offset_metadata" to be played from the playlist file that has been saved. Specifically, the hardware 71 searches for "offset_metadata" within the "metadata_block_entry" regarding which 1 is described as the "plane_identifier", and also including ID of the play item corresponding to the caption data to be played and the ID of the AV stream thereof. Also, the hardware 71 searches for "offset_metadata" within the "metadata_block_entry" regarding which 0 is described as the "plane_identifier", and also including ID of the play item corresponding to the menu data to be played, with "0XFF" described for the "ref_to_stream_id".

In step S35, determination is made by the hardware 71 regarding whether or not the current playing point-in-time is the playing point-in-time indicated by the "offset_pts" within the "offset_metadata" searched in step S34. In the event that determination is made in step S35 that the current playing point-in-time is not the playing point-in-time indicated by the "offset_pts" within the "offset_metadata" that has been searched, the flow stands by until the current playing point-in-time is the playing point-in-time indicated by the "offset_pts" within the "offset_metadata" that has been searched.

On the other hand, in the event that determination is made in step S35 that the current playing point-in-time is the playing point-in-time indicated by the "offset_pts" within the "offset_metadata" that has been searched, the flow advances to step S36. In step S36, the hardware 71 sets offset information represented by the "offset_flag" and "offset_value" regarding the menu data and caption data described corresponding to the current playing point-in-time, as offset information to be used for generating menu data and caption data for the left eye and for the right eye, respectively.

In step S37, the hardware 71 generates 3D display data including the menu data and caption data for the left eye and for the right eye, based on the offset information set in step S36, and also generates audio data.

In step S38, the hardware 71 displays a 3D image based on the 3D display data in the display unit 51, and outputs audio corresponding to the audio data from the speaker 52.

In step S39, the system firmware 72 makes determination regarding whether or not to end offset setting processing in according with a command from the OS 73. In the event that determination is made in step S39 not to end offset setting processing, the flow returns to step S34, and the subsequent processing is repeated till determination is made to end the offset setting processing. On the other hand, in the event that determination is made in step S39 to end offset processing, the flow ends.

Note that an arrangement may be made wherein, after determination is made in step S39 not to end the offset setting information, the flow returns to the processing in step S35 until the play item to be played is updated.

Figure 9:
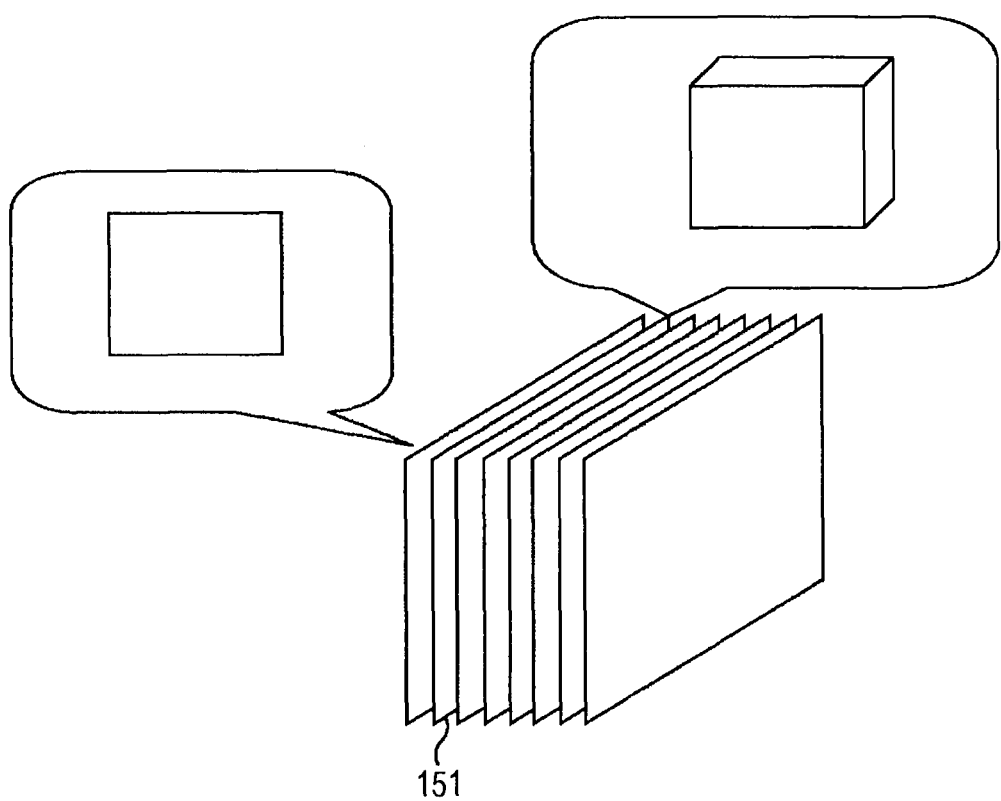
FIG. 9 is a diagram describing the effects of the playing device.

As described above, the playing device 20 first reads out and holds the playlist file, and sets offset information each time the playing point-in-time described in the database of the offset information within the playlist file comes. Accordingly, as shown in FIG. 9, the playing device 20 can set offset information as to a desired screen 151. That is to say, the playing device 20 can set offset information for captions and menu buttons as to a screen at a desired playing point-in-time, and perform 3D display of caption and menu buttons even in the event of executing a BD-J object without the concept of time. Accordingly, the video format of the disc 11 including the offset information database can be said to be a 3D video format suitable for 3D display of captions and menu buttons.

While omitted from the drawings, when executing movie objects as well, the playing device 20 first reads out and holds the playlist file, and sets offset information each time the playing point-in-time described in the database of the offset information within the playlist file comes, as with the offset setting processing in FIG. 8.

Also, an arrangement may be made wherein the Java (registered trademark) VM 74 defines an API (hereinafter referred to as an offset processing API) which switches on/off of setting functions for offset information included in the playlist file by the BD-J application 75 (hereinafter referred to as playlist setting functions). In this case, upon the offset processing API being called up while the playlist setting function is off, the offset setting processing in FIG. 8 is performed, and upon the offset processing API being called up while the playlist setting function is on, offset information is not set and captions or menu buttons are displayed in 2D. Offset processing commands may be defined for movie objects in the same way.

Also, an arrangement may be made wherein offset information is described in segments of the AV stream in the disc 11. In this case, offset information for captions and menu buttons is set in the offset information described in the segments for the captions and menu buttons. Note however, that offset information of menu buttons while a BD-J object is being executed is set by the BD-J application. The offset information set as described above is changed by the offset information database. Note that offset values described in the offset information database may be offset values following changing, or may be the offset values that have been changed.

Also, in this case, in the event that an offset processing API has been defined and the offset processing API is called up while the playlist setting function is on, the offset information of captions and menu buttons is no longer changed by the offset information database.

Second Embodiment

Description Example of Playlist File

FIG. 10 is a diagram illustrating a detailed description example of "offset_metadata ( )" in a playlist file in a second embodiment of a disc to which the present invention has been applied.

As shown in FIG. 10, a database of offset information is described in the "offset_metadata ( )".

In detail, 32-bit information indicating the length of "offset_metadata ( )" (length) is situated in the "offset_metadata ( )". Also, in each play item, 16-bit information representing the number of predetermined screens where offset information is set (hereinafter referred to as offset screen) (number_of_Plane_offsets[i]), 32-bit information representing the playing point-in-time of each offset screen (Plane_offset_pts[j]), 1-bit information representing whether or not the type of each offset screen is a menu button (is_IG_Offsets), and 1-bit information representing whether or not the type of each offset screen is caption (is_PG_Offsets), are provided.

Note that in the event that the type of the offset screen is a menu button, "1", for example, is described as 1-bit information representing that the type of the offset screen is a menu button. Also, in the event that the type of the offset screen is caption, "1", for example, is described as 1-bit information representing that the type of the offset screen is caption.

Also, in the event that the type of offset screen is a menu button, also described in the "offset_metadata ( )" are 1-bit information representing the offset direction set for that offset screen (IG_Plane_offset_direction[j]) and 6-bit information representing the offset value (IG_Plane_offset_value[j]), 5-bit information representing the time intervals of playing point-in-time of the sub-offset screen (described in detail later) (IG_Plane_sub_offset_rate[j]), 5-bit information representing the number of sub-offset screens (number_of_IG_Plane_sub_offsets[j]), 1-bit information representing the offset direction set in each sub-offset screen (IG_Plane_sub_offset_direction[k]), and 6-bit information representing the offset value set in each sub-offset screen (IG_Plane_sub_value[k]).

Note that a sub-offset screen is a screen between a corresponding offset screen and the following offset screen, where offset information is set. That is to say, offset screens are provided with relatively long time intervals, and sub-offset screens are provided with shorter time intervals between offset screens.

On the other hand, in the event that the type of offset screen is caption, also described in the "offset_metadata ( )" are 1-bit information representing the offset direction set for that offset screen (PG_Plane_offset_direction[j]) and 6-bit information representing the offset value (PG_Plane_offset_value[j]), 5-bit information representing the time intervals of playing point-in-time of the sub-offset screen (PG_Plane_sub_offset_rate[j]), 5-bit information representing the number of sub-offset screens (number_of_PG_Plane_sub_offsets[j]), 1-bit information representing the offset direction set in each sub-offset screen (PG_Plane_sub_offset_direction[k]), and 6-bit information representing the offset value set in each sub-offset screen (PG_Plane_sub_value[k]).

Configuration Example of Playing Device

FIG. 11 is a block diagram illustrating a configuration example of a playing device 210 for playing a disc 201 in which is recorded a playlist file including the description of "offset_metadata ( )" shown in FIG. 10.

Of the configurations shown in FIG. 11, configurations the same as the configurations in FIG. 6 are denoted with the same reference numerals. Redundant description will be omitted as appropriate.

The configuration of the playing device 210 in FIG. 11 primarily differs from the configuration of the playing device 20 in FIG. 6 with regard to the point that a playing unit 211 is provided instead of the playing unit 23.

The configuration of the playing unit 211 primarily differs from the configuration of the playing unit 23 in FIG. 6 with regard to the point that a 3D display data generating unit 221 is provided instead of the 3D display data generating unit 36.

In the same way as with the 3D display data generating unit 36 in FIG. 6, the 3D display data generating unit 221 holds playlist files supplied from the control unit 22 in built-in memory (not shown). Also, the 3D display data generating unit 221 generates display data for the left eye and display data for the right eye, from the video data supplied from the video generating unit 34 and the caption data and menu data supplied from the graphics generating unit 35.

Specifically, in the same way as with the 3D display data generating unit 36, the 3D display data generating unit 221 generates image data obtained as the result of shifting a main image corresponding to video data in one direction of the left and right directions by a predetermined offset value, in increments of screens, as video data for the left eye, and generates image data obtained as the result of shifting in the other direction as video data for the right eye.

Also, the 3D display data generating unit 221 recognizes, from the "offset_metadata ( )" within the playlist file held in the built-in memory, the playing point-in-time of a caption offset screen and sub-offset screen, and offset information corresponding to the playing point-in-time of the caption offset screen and sub-offset screen. The 3D display data generating unit 221 then generates caption data for the left eye and for the right eye from caption data supplied from the graphics generating unit 35 based on the playing point-intime and offset information. In the same way, the 3D display data generating unit 221 generates menu data for the left eye and for the right eye from the playing point-in-time of the menu button offset screen and sub-offset screen, and offset information corresponding to the offset screen and sub-offset screen, recognized from the "offset_metadata ( )" within the playlist file.

The 3D display data generating unit 221 synthesizes the video data, caption data, and menu data for the left eye and right eye that has been generated in this way, by data for each eye. The 3D display data generating unit 221 supplies the display data for the left eye and the display data for the right eye obtained as a result thereof to the display unit 51 as 3D display data.

Functional Configuration Example of Playing Device

Figure 12:
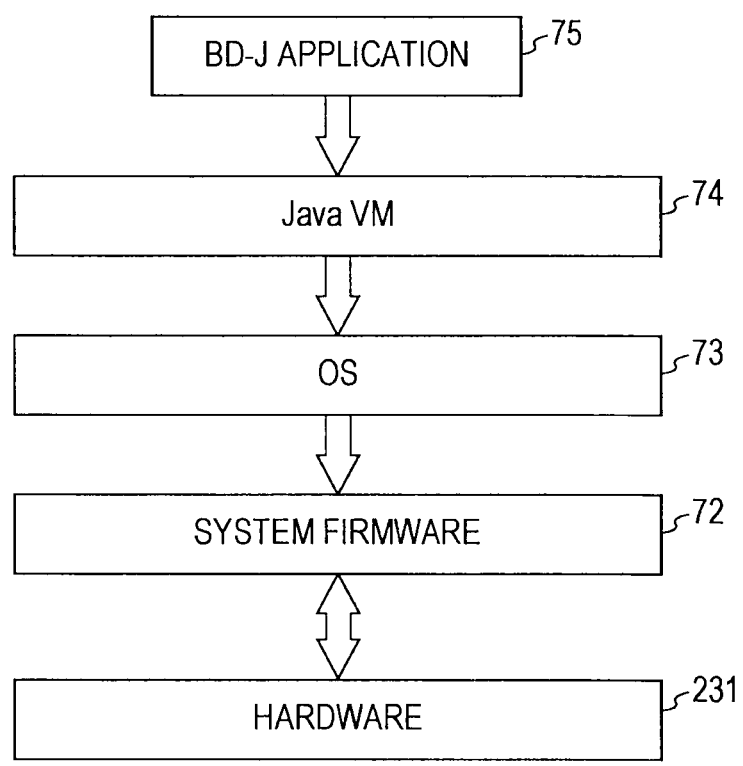
FIG. 12 is a diagram illustrating an example of a function configuration of the playing device when executing a BD-J object.

FIG. 12 is a diagram illustrating a functional configuration example of the playing device 210 when executing a BD-J object.

Of the configurations shown in FIG. 12, configurations the same as the configurations in FIG. 7 are denoted with the same reference numerals. Redundant description will be omitted as appropriate.

The configuration in FIG. 12 primarily differs from the configuration in FIG. 7 with regard to the point that hardware 231 is provided instead of the hardware 71.

The hardware 231 corresponds to the input unit 21, playing unit 211, storage unit 24, and so forth.

[Processing of Playing Device]

FIG. 13 is a flowchart describing offset setting processing by the playing device 210 at the time of executing a BD-J object. This offset setting processing is started when the system firmware 72 loads the BD-J application 75 which sets the offset information to the Java (registered trademark) VM 74, for example.

The processing of steps S51 through S53 is the same as the processing of steps S31 through S33 in FIG. 8, so description thereof will be omitted.

After the processing in step S53, in step S54 the hardware 231 searches for information regarding the play item to be played from the playlist file that has been saved. Specifically, the hardware 231 searches for information representing the playing point-in-time of each offset screen corresponding to the play item ID to be played, and information representing the offset direction of each offset screen and information representing the offset value. Also, the hardware 231 searches for information representing the time interval of the playing point-in-time of the sub-offset screen corresponding to the ID of the play item to be played, information representing the offset direction of each sub-offset screen, information representing the offset value of each sub-offset screen, and so forth. The hardware 231 then obtains the playing point-in-time of each sub-offset screen based on the information representing the playing point-in-time of each offset screen, and the information representing the time interval of the playing point-in-time of the sub-offset screen.

In step S55, determination is made by the hardware 231 regarding whether or not the current playing object is an offset screen or a sub-offset screen. Specifically, the hardware 231 determines whether or not the current playing point-in-time is the playing point-in-time which the information representing the playing point-in-time of the offset screen searched in step S54, or the playing point-in-time of the sub-offset screen obtained in step S54.

In the event that determination is made in step S55 that the current playing object is an offset screen or a sub-offset screen, in step S56 the hardware 231 sets the offset direction and offset value of the offset screen or sub-offset screen searched in step S54 as the current offset information. After the processing in step S56, the flow advances to step S57.

On the other hand, in the event that determination is made in step S55 that the current playing object is neither an offset screen nor a sub-offset screen, the processing in step S56 is skipped and the flow advances to step S57.

Note that the processing in step S55 and step S56 is performed for each of caption data and menu data.

In step S57, the hardware 231 generates 3D display data including the menu data and caption data for the left eye and for the right eye based on the offset information set as the current offset information, and also generates audio data.

In step S58, the hardware 231 displays a 3D image based on the 3D display data in the display unit 51, and outputs audio corresponding to the audio data from the speaker 52.

In step S59, the system firmware 72 makes determination regarding whether or not to end offset setting processing in according with a command from the OS 73. In the event that determination is made in step S59 not to end offset setting processing, the flow returns to step S54, and the subsequent processing is repeated till determination is made to end the offset setting processing. On the other hand, in the event that determination is made in step S59 to end offset setting processing, the flow ends.

Note that an arrangement may be made wherein, after determination is made in step S59 not to end the offset setting information, the flow returns to the processing in step S55 until the play item to be played is updated.

As described above, the playing device 210 first reads out and holds the playlist file, and sets offset information each time the playing point-in-time of the offset image and sub-offset image, described in the database of the offset information within the playlist file, comes. Accordingly, as shown in FIG. 9, the playing device 210 can set offset information as to a desired screen 151. Accordingly, the video format of the disc 201 including the offset information database can be said to be a 3D video format suitable for 3D display of captions and menu buttons.

Also, with the playlist file recorded in the disc 201, offset screens and sub-offset screens are set, and offset information is described for each of the offset screens and sub-offset screens. The playing device 210 updates the offset information each time the playing point-in-time for the offset screens and sub-offset screens comes. Accordingly, the data amount of the playlist file can be reduced as compared to the disc 11 wherein offset information is described for all images regarding which offset information is set.

Third Embodiment

Description Example of Playlist File

FIG. 14 is a diagram illustrating a detailed description example of "offset_metadata ( )" in a playlist file in a third embodiment of a disc to which the present invention has been applied.

As shown in FIG. 14, a database of offset information is described in the "offset_metadata ( )".

In detail, situated in the "offset_metadata ( )" is 32-bit information indicating the length of "offset_metadata ( )" (length), 4-bit information representing an ID unique to a set of offset information for each play item that is provided to the set of offset information (hereinafter referred to as offset ID) (number_of_offset_id), and a 12-bit empty region (reserved_for_future_use) for future use. Also provided are 16-bit information representing the number of offset screens corresponding to the sets of offset information to which each offset ID has been provided, for each play item (number_of_offsets), and information relating to the sets of offset information (hereinafter referred to as set information).

32-bit information representing the playing point-in-time of each offset screen (offset_pts[j]), 1-bit information representing the offset direction (offset_direction[j]), and 6-bit information representing the offset value (offset_value[j]) are provided as set information. Also, 5-bit information representing the time intervals of playing point-in-time of the sub-offset screen (sub_offset_rate[j]), 5-bit information representing the number of sub-offset screens (number_of_sub_offsets[j]), 1-bit information representing the offset direction set in each sub-offset screen (sub_offset_direction [k]), and 6-bit information representing the offset value set in each sub-offset screen (sub_offset_value[k]) are described as set information.

Each play item of a playlist file with an "offset_metadata ( )" such as shown above described has an offset ID for caption data and menu data of an AV stream to be played described, in a manner correlated with information specifying a clip information file and time information representing the playing section of the AV stream. Accordingly, offset IDs are correlated with the caption data and menu data of AV streams to be played.

Note that in the event of not setting offset information in the caption data and menu data to be played, 0 is described as the offset ID. That is to say, a valid offset ID is a value of 1 or greater and 8 or smaller, so in the event that the offset ID is 0, offset information is not set. Also, the offset ID of the menu data when executing a BD-J object is specified by the API. Accordingly, an offset ID is correlated with the menu data when executing a BD-J object.

Configuration Example of Playing Device

Figure 15:
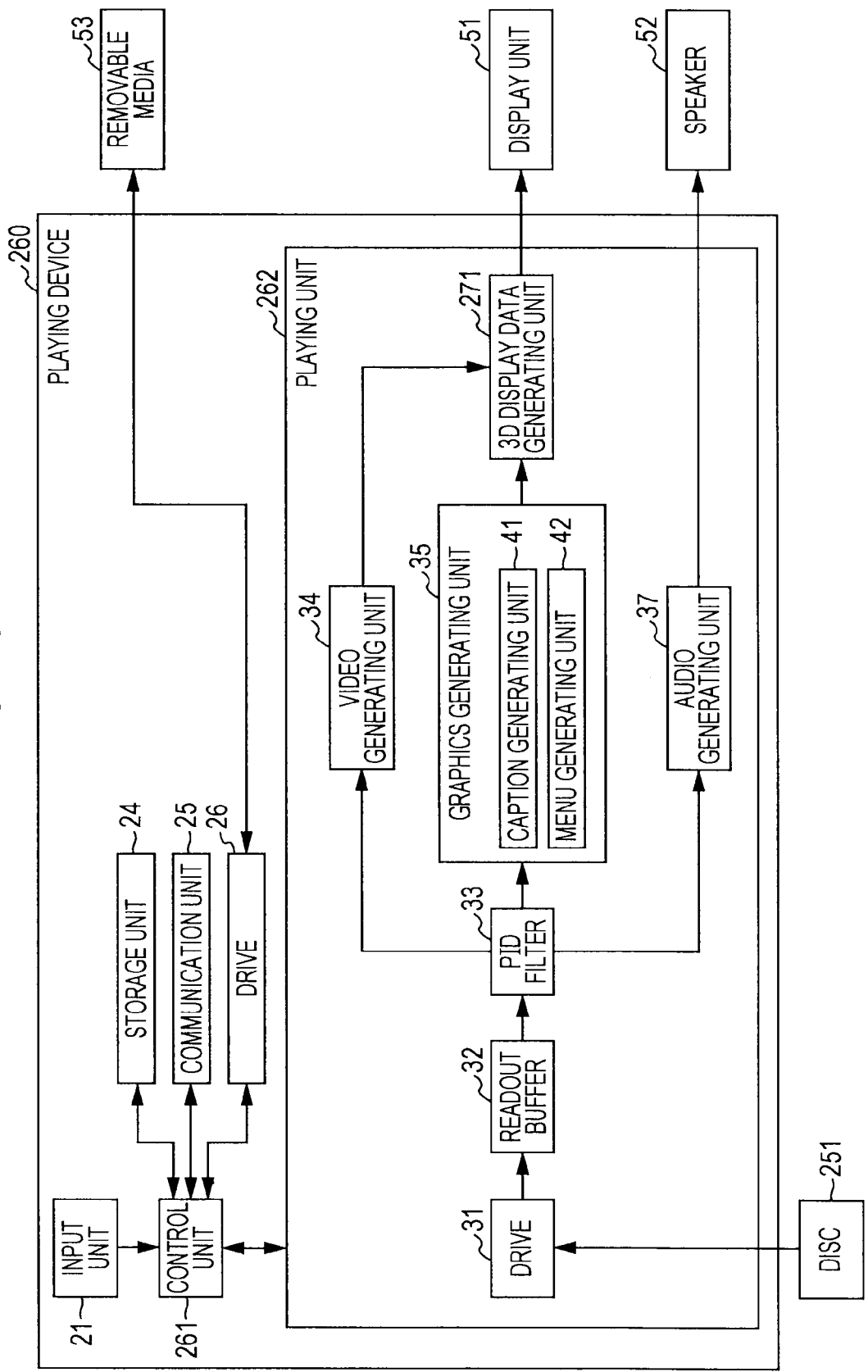
FIG. 15 is a block diagram illustrating a configuration example of a playing device.

FIG. 15 is a block diagram illustrating a configuration example of a playing device 260 for playing a disc 251 in which is recorded a playlist file including the description of "offset_metadata ( )" shown in FIG. 14.

Of the configurations shown in FIG. 15, configurations the same as the configurations in FIG. 6 are denoted with the same reference numerals. Redundant description will be omitted as appropriate.

The configuration of the playing device 260 in FIG. 15 primarily differs from the configuration of the playing device 20 in FIG. 6 with regard to the point that a control unit 261 is provided instead of the control unit 22 and the point that a playing unit 262 is provided instead of the playing unit 23.

The control unit 261 controls the playing unit 23 in accordance with instructions from the input unit 21 by executing a predetermined program. For example, the control unit 261 supplies playlist files recorded in the disc 251 to the 3D display data generating unit 36 in accordance with an instruction from the input unit 21 to perform 3D playing of the disc 251. Also, the control unit 261 supplies an offset ID, for example to a 3D display data generating unit 271, following a BD-J object file recorded in the disc 251.

The configuration of the playing unit 262 primarily differs from the configuration of the playing unit 23 in FIG. 6 with regard to the point that the 3D display data generating unit 271 is provided instead of the 3D display data generating unit 36.

In the same way as with the 3D display data generating unit 36 in FIG. 6, the 3D display data generating unit 271 holds playlist files supplied from the control unit 261 in built-in memory (not shown). Also, the 3D display data generating unit 271 generates display data for the left eye and display data for the right eye, from the video data supplied from the video generating unit 34 and the caption data and menu data supplied from the graphics generating unit 35.

Specifically, in the same way as with the 3D display data generating unit 36 in FIG. 6, the 3D display data generating unit 271 generates image data obtained as the result of shifting a main image corresponding to video data in increments of screens in one direction of the left and right directions by a predetermined offset value, as video data for the left eye, and generates image data obtained by shifting in the other direction as video data for the right eye.

Also, the 3D display data generating unit 271 recognizes, from the playlist file held in the built-in memory, the offset ID of caption data to be played. The 3D display data generating unit 271 searches for set information corresponding to the offset ID from the "offset_metadata ( )" within the playlist file, and generates caption data for the left eye and for the right eye from caption data supplied from the graphics generating unit 35 based on the set information.

In the same way, when executing a movie object, the 3D display data generating unit 271 generates menu data for the left eye and for the right eye based on set information corresponding to the offset ID of the menu data to be played that is described in the playlist file. On the other hand, when executing a BD-J object, the 3D display data generating unit 271 generates menu data for the left eye and for the right eye based on set information corresponding to the offset ID supplied from the control unit 261.

The 3D display data generating unit 271 synthesizes the video data, caption data, and menu data for the left eye and right eye that has been generated in this way, by data for each eye. The 3D display data generating unit 271 supplies the display data for the left eye and the display data for the right eye obtained as a result thereof to the display unit 51 as 3D display data.

Functional Configuration Example of Playing Device

Figure 16:
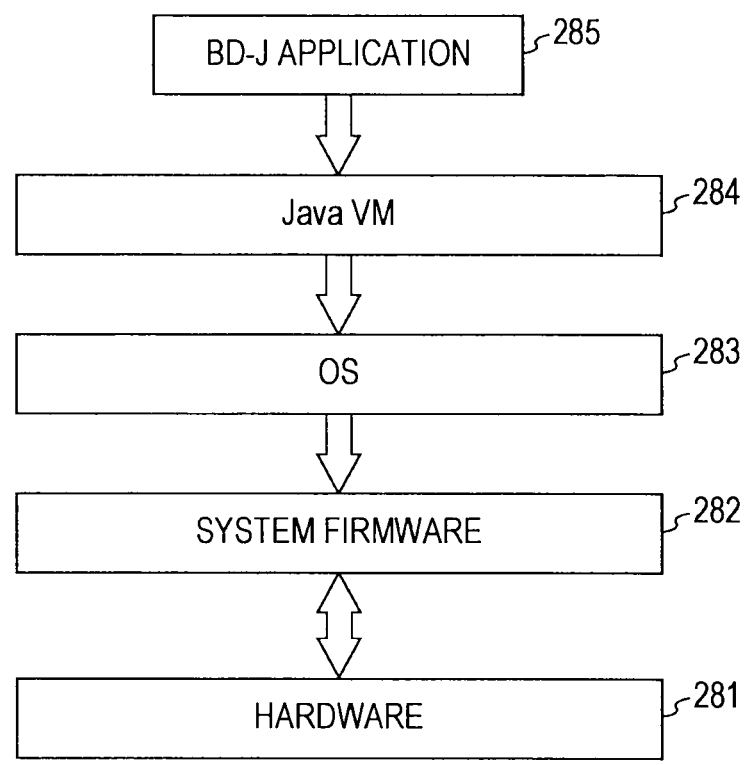
FIG. 16 is a diagram illustrating an example of a function configuration of the playing device when executing a BD-J object.

FIG. 16 is a diagram illustrating a functional configuration example of the playing device 260 when executing a BD-J object.

The hardware 281 corresponds to the input unit 21, playing unit 262, storage unit 24, and so forth.

Upon a disc 251 being mounted to the hardware 281, the system firmware 282 controls the hardware 281 so as to read out the index file from the disc 251. The system firmware 282 then stores the index file in the hardware 281.

Also, the system firmware 282 reads out the index file from the hardware 281, and recognizes an object type and No. corresponding to a title No. to be processed, that is described within the index file. In the example in FIG. 16, the type of this object is a BD-J object.

The system firmware 282 controls the hardware 281 based on the No. of the BD-J object corresponding to the title No. to be processed, so as to read out the BD-J object to be processed from the disc 251, which is then stored in the hardware 281. After recognizing the BD-J application 285 to be executed based on that BD-J object, the system firmware 282 activates the Java (registered trademark) VM 284. The system firmware 282 then loads the BD-J application 285 to the Java (registered trademark) VM 284. Note that an arrangement may be made wherein the Java (registered trademark) VM 284 is activated in the time between after the disc 251 being mounted to the hardware 281 up to the BD-J application 285 to be executed being recognized.

Also, the system firmware 282 controls the hardware 281 in response to a playlist readout function call-up from the OS 283 corresponding to a call-up API for readout of the playlist by the BD-J application 285 so as to read out the playlist file from the disc 251 and store it.

Further, the system firmware 282 controls the hardware 281 in response to a call-up for an offset setting function from the OS 283, in response to a call-up for an API for setting offset by the BD-J application 285 (hereinafter referred to as offset setting API), so as to set offset information for menu data.

Based on the function notified from the Java (registered trademark) VM 284, the OS 283 performs a function call-up as to the system firmware 282 corresponding to that function. For example, based on a playlist readout function and offset setting function notified from the Java (registered trademark) VM 284 in accordance with the playlist readout API and offset setting API call-up from the BD-J application 285, the OS 283 performs call-up of the playlist readout function and the offset setting function as to the system firmware 282 corresponding to that playlist readout function and offset setting function.

The Java (registered trademark) VM 284 interprets functions corresponding to the APIs called up by the BD-J application 285, and notifies this to the OS 283. For example, the Java (registered trademark) VM 284 interprets the function corresponding to the playlist readout API and offset setting API read out by the BD-J application 285, and makes notification to the OS 283 of the playlist readout function and offset setting function.

The BD-J application 285 performs call-up of an API stipulated by the Java (registered trademark) VM 284, as to the Java (registered trademark) VM 284. For example, the BD-J application 285 performs call-up of a playlist readout API or offset setting API as to the Java (registered trademark) VM 284.

[Processing of Playing Device]

Figure 17:
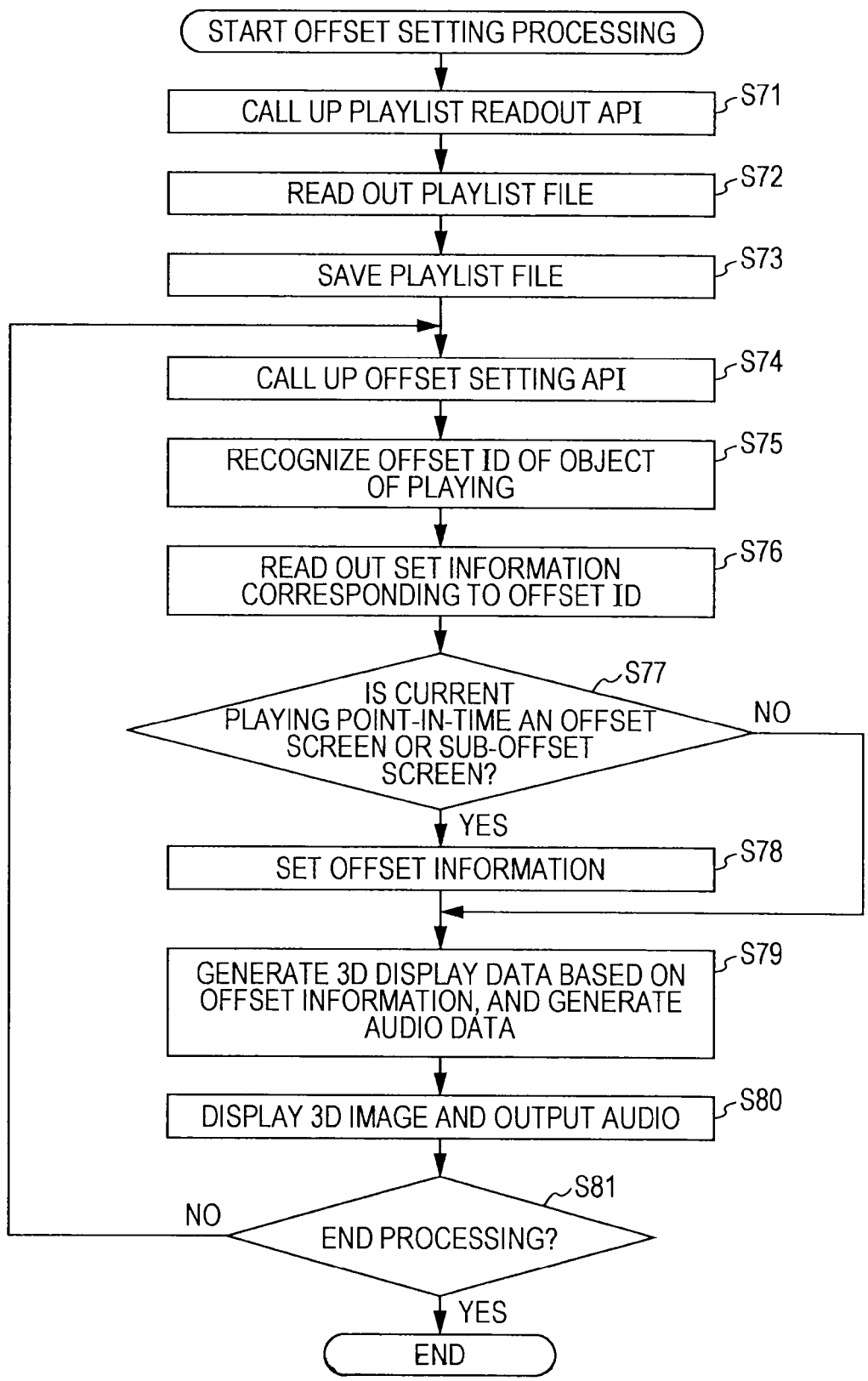
FIG. 17 is a flowchart for describing offset setting processing with the playing device when executing a BD-J object.

FIG. 17 is a flowchart describing offset setting processing by the playing device 260 at the time of executing a BD-J object. This offset setting processing is started when the system firmware 282 loads the BD-J application 285 which sets the offset information to the Java (registered trademark) VM 284, for example.

The processing of steps S71 through S73 is the same as the processing of steps S31 through S33 in FIG. 8, so description thereof will be omitted.

After the processing in step S73, in step S74 The BD-J application 285 performs a call-up to the Java (registered trademark) VM 284 for the offset setting API. Accordingly, the Java (registered trademark) VM 284 recognizes the offset setting function as a function corresponding to the offset setting API, and makes notification to the OS 283. The OS 283 then performs call-up of offset setting functions as to the system firmware 282 corresponding to the offset setting function. Thus, the system firmware 282 notifies the predetermined offset ID to the hardware 281.

In step S75, the hardware 281 recognizes the offset ID supplied from the system firmware 282 as the offset ID for the menu data that is to be played. Also, the hardware 281 searches for the saved playlist file, and recognizes the offset ID of the caption data to be played.

In step S76, the hardware 281 reads out set information corresponding to the offset ID recognized in step S75, from the "offset_metadata ( )" of the saved playlist file. The hardware 281 then obtains the playing point-in-time of each sub-offset screen based on, of the set information, information representing the playing point-in-time of each offset screen, and information representing the time intervals of the playing point-in-time of the sub-offset screens.

In step S77, determination is made by the hardware 281 regarding whether or not the current playing object is an offset screen or a sub-offset screen. Specifically, the hardware 281 determines whether or not the current playing point-in-time is, of the set information read out in step S76, the playing point-in-time which the information representing the playing point-in-time of the offset screen represents, or the playing point-in-time of the sub-offset screen obtained in step S76.

In the event that determination is made in step S77 that the current playing object is an offset screen or a sub-offset screen, in step S78 the hardware 281 sets, of the set information read out in step S75, the offset information of the offset screen or sub-offset screen, as the current offset information. After the processing in step S78, the flow advances to step S79.

On the other hand, in the event that determination is made in step S77 that the current playing object is neither an offset screen nor a sub-offset screen, the processing in step S78 is skipped and the flow advances to step S79.

Note that the processing in step S77 and step S78 is performed for each of caption data and menu data.

In step S79, the hardware 281 generates 3D display data including the menu data and caption data for the left eye and for the right eye based on the offset information set as the current offset information, and also generates audio data.

In step S80, the hardware 281 displays a 3D image based on the 3D display data in the display unit 51, and outputs audio corresponding to the audio data from the speaker 52.

In step S81, the system firmware 282 makes determination regarding whether or not to end offset setting processing in according with a command from the OS 283. In the event that determination is made in step S81 not to end offset setting processing, the flow returns to step S74, and the subsequent processing is repeated till determination is made to end the offset setting processing. Note however, that the processing of step S74 is performed as necessary.

On the other hand, in the event that determination is made in step S81 to end offset setting processing, the flow ends.

Note that while in the above description, the offset ID of the caption data and menu data of the AV stream is described in the playlist file, but an arrangement may be made wherein this offset ID is specified by a navigation command described in a movie object or menu data segment. In this case, the set of offset information can be dynamically changed even while executing a movie object.

As described above, the playing device 260 first reads out and holds the playlist file, and sets offset information each time the playing point-in-time of the offset screen and sub-offset screen described by offset ID in the database of the offset information within the playlist file comes. Accordingly, as shown in FIG. 9, the playing device 260 can set offset information as to a desired screen 151. Accordingly, the video format of the disc 251 including the offset information database can be said to be a 3D video format suitable for 3D display of captions and menu buttons.

Also, with the playlist file recorded in the disc 251, an offset ID is provided to the set information, so specifying the caption data and menu data set information with the offset ID does away with the need to describe the same set information multiple times. Accordingly, the data amount of the playlist file can be reduced.

For example, even in a case wherein offset information is set for each AV stream, all that has to be described with the playlist file of the disc 251 is sets of offset information that is not redundant. Accordingly, the amount of data of the playlist file can be reduced as compared to a case wherein offset information is all described for each AV stream, as with the playlist file in disc 11. As a result, an AV stream with a sufficient length can be handled with one playlist file.

Note that in the event that offset information is to be set for each AV stream, an arrangement may be made, for example, wherein the position in the vertical direction as to the display plane of Japanese captions is made to be different from the position in the vertical direction as to the display plane of English captions. This is particularly useful in the event that the display positions of Japanese captions and English captions are different.

Figure 18:
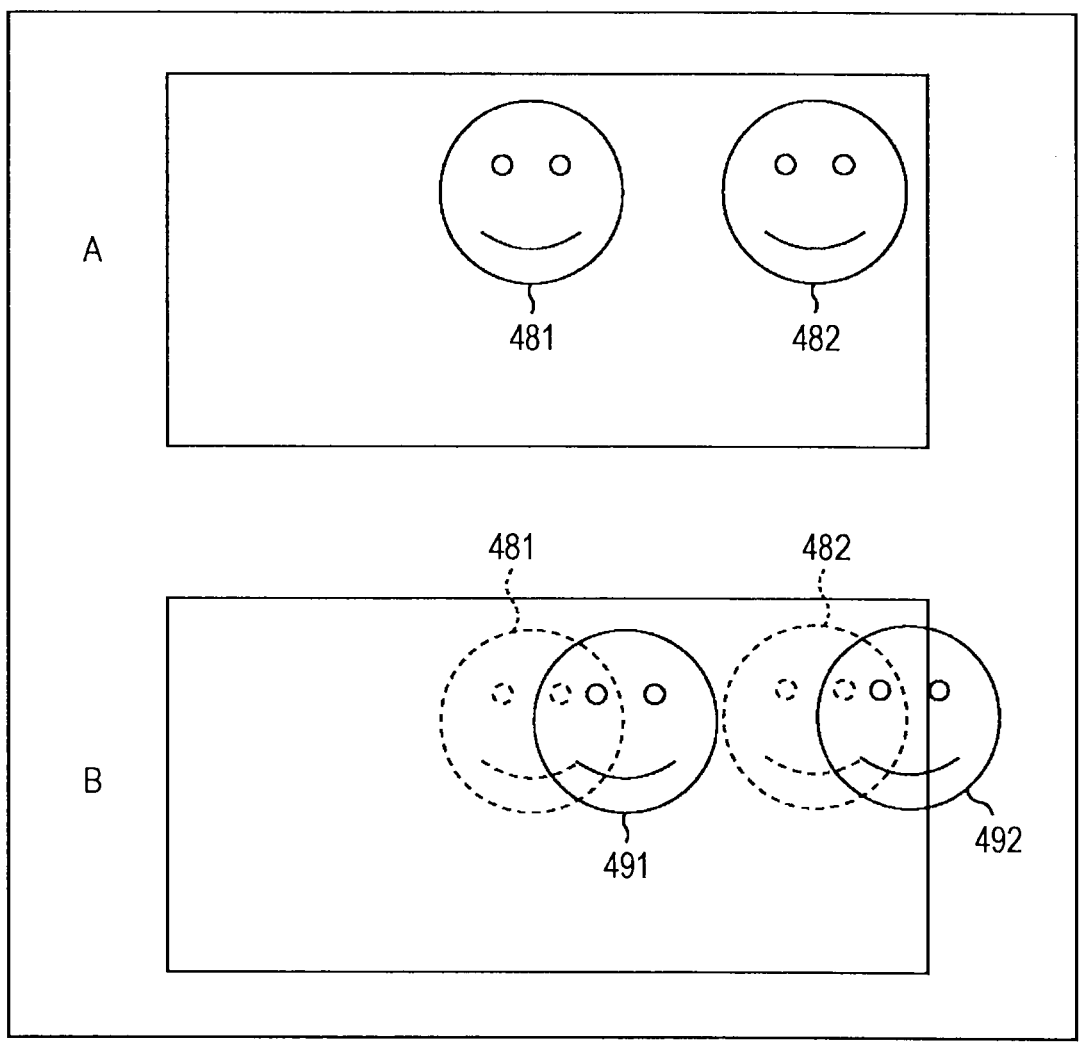
FIG. 18 is a diagram for describing forbidden items in offset information.

Also, the offset information in the present embodiment is set such that the captions and menu buttons for the right eye and the captions and menu buttons for the left eye do not run over the edge of the screen. That is to say, for example, in the event that caption data of captions 481 and 482 is recorded in the disc as shown in A in FIG. 18, offset information which would shift the captions 481 and 482 to the captions 491 and 492 shown in B in FIG. 18 is not set.

Further, with the above description, the playlist file is supplied from the control unit 22 (261) to the 3D display data generating unit 36 (221, 271), and the 3D display data generating unit 36 (221, 271) holds the playlist file in built-in memory, but the playlist file may be stored in the storage unit 24. In this case, the control unit 22 (261) searches for offset information corresponding to the playing point-in-time of the caption data and menu data to be played, and supplies that offset information to the 3D display data generating unit 36 (221, 271). The 3D display data generating unit 36 (221, 271) then generates 3D display data based on the offset information.

Also, with the above description, the 3D display data generating unit 36 (221, 271) uses video data for performing 2D display of a main image to generate video data for the right eye and for the left eye, but in the event that video data for the right eye and for the left eye is recorded in the disc 11 (201, 251), the video data for the right eye and for the left eye is used as it is for generating the 3D display data, in the same way as with later-described fourth through sixth embodiments.

Fourth Embodiment

Configuration Example of Disc

Figure 19:
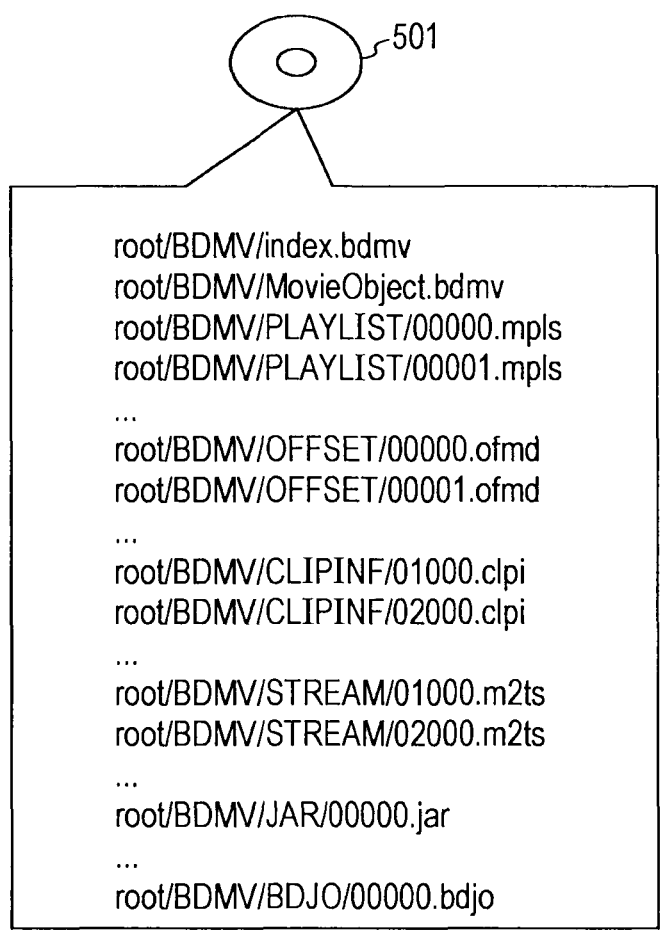
FIG. 19 is a diagram illustrating a configuration example of a fourth embodiment of a disc to which the present invention has been applied.

FIG. 19 is a diagram illustrating a configuration example of a fourth embodiment of a disc to which the present invention has been applied.

A disc 501 in FIG. 19 has the "offset_metadata ( )" shown in FIG. 5 described in a separate file from the playlist file (PLAYLIST/XXXXX.mpls), unlike the above-described disc 11 (201, 251).

Specifically, as shown in FIG. 19, recorded in the disc 501 is "offset_metadata ( )" as an offset file (OFFSET/XXXXX.ofmd) of a directory separate from the playlist file, separately from the playlist file (PLAYLIST/XXXXX.mpls). Note that X is an optional number from 0 to 9.

Also, with the disc 501, described within the playlist file is reference file information, which is information specifying an offset file to reference at the time of playing, in accordance with the playlist file.

Further recorded in the disc 501 as a stream file is an AV stream configured of TS packets of video data for performing 3D display of main images which has been encoded confirming to MPEG2, MPEG-4 AVC, VC1, MVC (Multiview Video Coding), or the like, and multiplexed confirming to ISO 13818-2, and audio data corresponding thereto, caption data for performing 2D display of caption, and menu data for performing 2D display of menu buttons. That is to say, the video data included in the AV stream recorded in the disc 501 is not data for 2D display of the main image, but data for 3D display.

Note that while "offset_metadata ( )" is recorded as the offset file for a different directory from the playlist file, this may be recorded as a different file (PLAYLIST/XXXXX.ofmd) in the same directory as the playlist file.

Configuration Example of Playing Device

Figure 20:
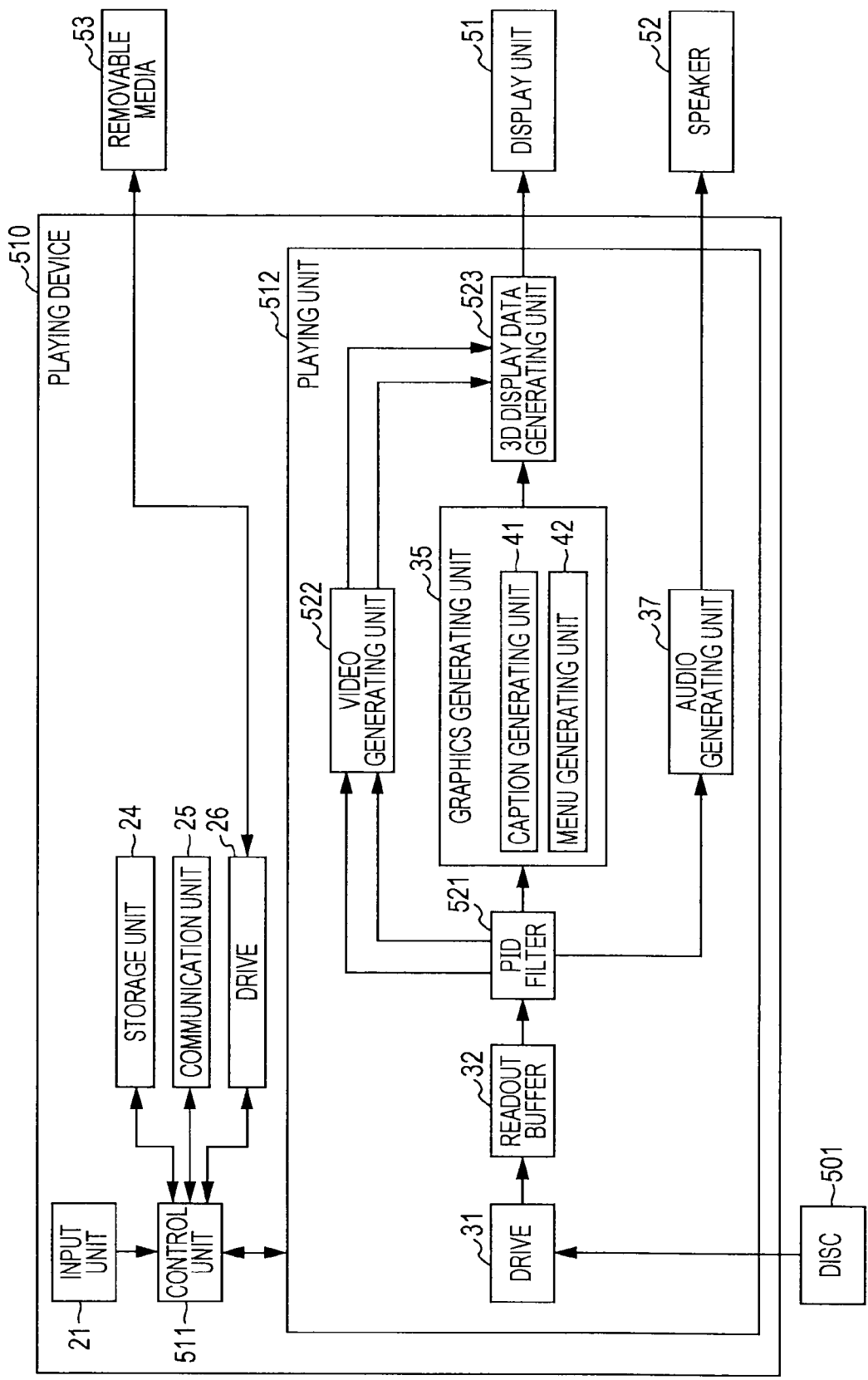
FIG. 20 is a block diagram illustrating a configuration example of a playing device for playing the disc in FIG. 19.

FIG. 20 is a block diagram illustrating a configuration example of a playing device 510 for playing the disc 501 in FIG. 19.

Of the configurations shown in FIG. 20, configurations the same as the configurations in FIG. 6 are denoted with the same reference numerals. Redundant description will be omitted as appropriate.

The configuration of the playing device 510 in FIG. 20 primarily differs from the configuration of the playing device 20 in FIG. 6 with regard to the point that a control unit 511 and playing unit 512 are provided instead of the control unit 22 and playing unit 23.

The control unit 511 controls the playing unit 23 in accordance with instructions from the input unit 21 by executing a predetermined program. For example, the control unit 511 reads out a playlist file recorded in the disc 501 in accordance with an instruction from the input unit 21 for 3D playing of the disc 501, and holds this in the storage unit 24.

Also, the control unit 511 reads out an offset file based on the reference file information described in the playlist file held in the storage unit 24, and holds this in the storage unit 24. The control unit 511 then searches for offset information corresponding to the playing point-in-time of the caption data to be played, from the "offset_metadata ( )" within the offset file. In the same way, the control unit 511 searches for offset information corresponding to the current playing point-in-time of the menu data to be played, from the "offset_metadata ( )" within the offset file. The control unit 511 then supplies the offset information of the caption data and the offset information of the menu data obtained as a result of the search to the playing unit 512.

The configuration of the playing unit 512 primarily differs from the configuration of the playing unit 23 with regard to the point that a PID filter 521, a video generating unit 522, and a 3D display data generating unit 523, are provided instead of the PID filter 33, video generating unit 34, and 3D display data generating unit 36.

The PID filter 521 extracts the packets for each of the video data for the left eye, video data for the right eye, caption data, menu data, and audio data, included in the AV stream, based on the packet ID (PID) of the packets of the AV stream from the readout buffer 32.

The PID filter 521 extracts PES packets from each of the extracted packets for each of the video data for the left eye, video data for the right eye, caption data, menu data, and audio data. The PID filter 521 then supplies the PES packets of the video data for the left eye and for the right eye to the video generating unit 522, and supplies the PES packets of the caption data and menu data to the graphics generating unit 35. The PID filter 521 also supplies the PES packets of the audio data to the audio generating unit 37.

The video generating unit 522 decodes the PES packets of video data for the left eye and for the right eye supplied from the PID filter 521, and supplies video data for the left eye and for the right eye obtained as the result thereof to the 3D display data generating unit 523.

The 3D display data generating unit 523 generates caption data for the left eye and for the right eye, based on the offset information for caption data supplied from the control unit 511. In the same way, the 3D display data generating unit 523 generates menu data for the left eye and for the right eye, based on the offset information for menu data supplied from the control unit 511.

The 3D display data generating unit 523 synthesizes the caption data and menu data for the left eye and right eye that has been generated in this way, and the video data for the left eye and for the right eye supplied from the video generating unit 522, by data for each eye. The 3D display data generating unit 523 supplies the display data for the left eye and the display data for the right eye obtained as a result thereof to the display unit 51 as 3D display data.

[Detailed Description of 3D Display Data Generating Unit]

Figure 21:
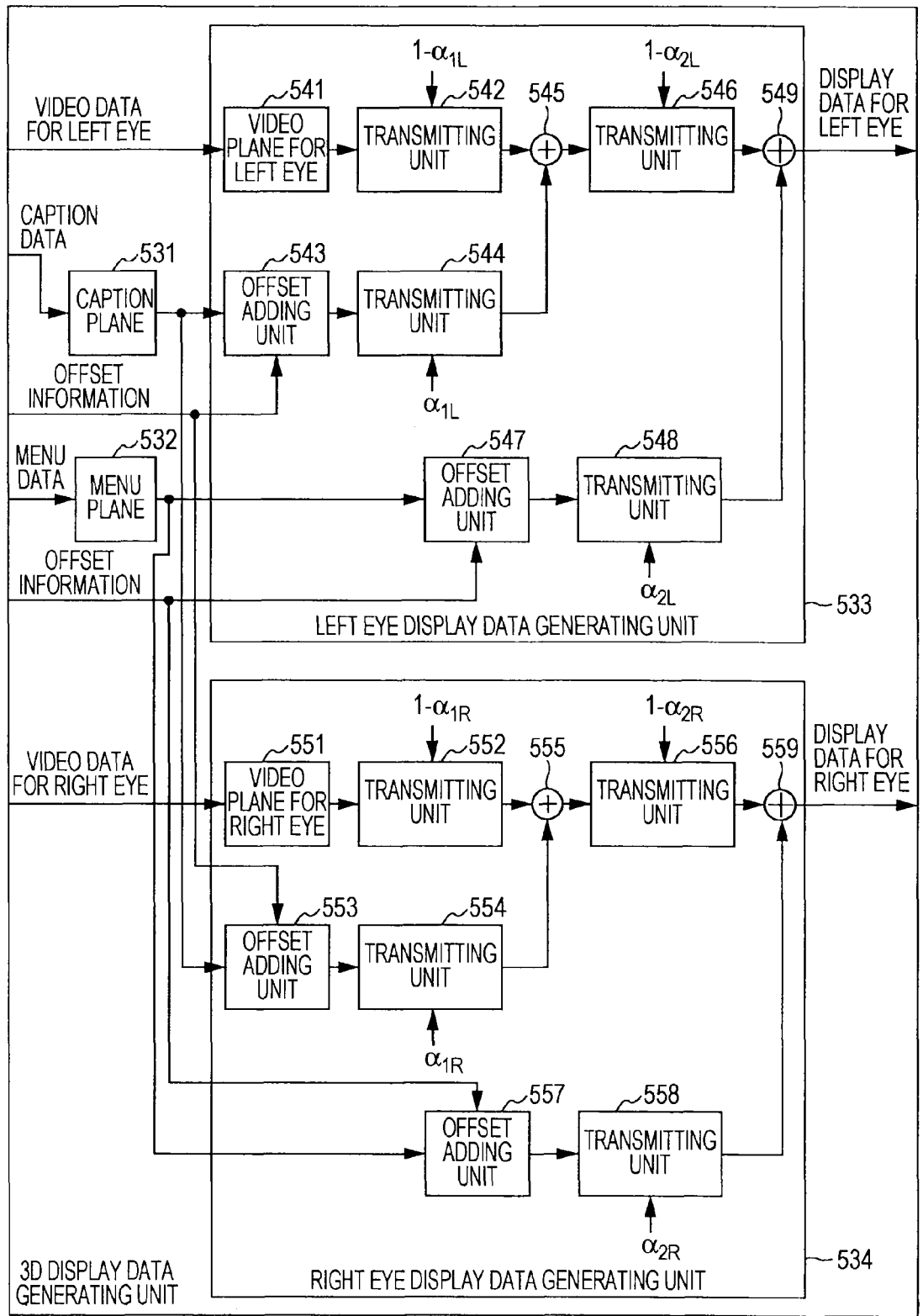
FIG. 21 is a block diagram illustrating a detailed configuration example of the 3D display data generating unit in FIG. 20.

FIG. 21 is a block diagram illustrating a detailed configuration example of the 3D display data generating unit 523 in FIG. 20.

As shown in FIG. 21, the 3D display data generating unit 523 is configured of a caption plane 531, a menu plane 532, a left eye display data generating unit 533, and a right eye display data generating unit 534.

The caption plane 531 holds caption data supplied from the caption generating unit 41 (FIG. 20) of the graphics generating unit 35.

The menu plane 532 holds menu data supplied from the menu generating unit 42 (FIG. 20) of the graphics generating unit 35.

The left eye display data generating unit 533 is configured of a video plane for left eye 541, a transmitting unit 542, an offset adding unit 543, a transmitting unit 544, a synthesizing unit 545, a transmitting unit 546, an offset adding unit 547, a transmitting unit 548, and a synthesizing unit 549.

The video plane for left eye 541 holds video data for the left eye supplied from the 3D video generating unit 34.

The transmitting unit 542 reads out video data for the left eye that is held in the video plane for left eye 541. The transmitting unit 542 converts the video data for the left eye that has been read out so that the main image for the left eye is transmits at a preset transmissivity $(1-\alpha_{1L})$. The transmitting unit 542 supplies the video data for the left eye following conversion to the synthesizing unit 545.

The offset adding unit 543 reads out caption data from the caption plane 531. The offset adding unit 543 generates caption data for the left eye from the caption data read out, based on the offset information of caption data supplied from the control unit 511 in FIG. 20. Specifically, the offset adding unit 543 generates caption data, obtained as the result of shifting captions in increments of screens corresponding to the caption data read out, in the offset direction of the offset information by the offset value, as caption data for the left eye. The offset adding unit 543 supplies the caption data for the left eye to the transmitting unit 544.

The transmitting unit 544 converts caption data for the left eye supplied from the offset adding unit 543 so that the caption for the left eye transmits at a preset transmissivity $\alpha_{1L}$. The transmitting unit 544 supplies the caption data for the left eye following conversion to the synthesizing unit 545.

The synthesizing unit 545 synthesizes the video data for the left eye that is supplied from the transmitting unit 542 and the caption data for the left eye supplied from the transmitting unit 544, and supplies the data obtained as the result thereof to the transmitting unit 546.

The transmitting unit 546 converts the data from the transmitting unit 545 so that an image corresponding to this data transmits at a transmissivity $(1-\alpha_{2L})$, and supplies to the synthesizing unit 549.

The offset adding unit 547 reads out menu data from the menu plane 532. The offset adding unit 547 generates menu data for the left eye from the menu data read out, based on the offset information of menu buttons supplied from the control unit 521 in FIG. 20. Specifically, the offset adding unit 547 generates menu data, obtained as the result of shifting menu buttons in increments of screens corresponding to the menu data read out, in the offset direction of the offset information by the offset value, as menu data for the left eye. The offset adding unit 547 supplies the menu data for the left eye to the transmitting unit 548.

The transmitting unit 548 converts menu data for the left eye supplied from the offset adding unit 547 so that menu buttons for the left eye transmit at a preset transmissivity $\alpha_{2L}$. The transmitting unit 548 supplies the menu data for the left eye following conversion to the synthesizing unit 549.

The synthesizing unit 549 synthesizes the data that is supplied from the transmitting unit 546 and the menu data supplied from the transmitting unit 548, and outputs the data obtained as the result thereof as display data for the left eye.

The right eye display data generating unit 534 is configured of a video plane for right eye 551, a transmitting unit 552, an offset adding unit 553, a transmitting unit 554, a synthesizing unit 555, a transmitting unit 556, an offset adding unit 557, a transmitting unit 558, and a synthesizing unit 559. The processing of each part of the right eye display data generating unit 534 is the same as the processing of each part of the left eye display data generating unit 533 except for the object of processing being data for the right eye, so description will be omitted.

Functional Configuration Example of Playing Device

Figure 22:
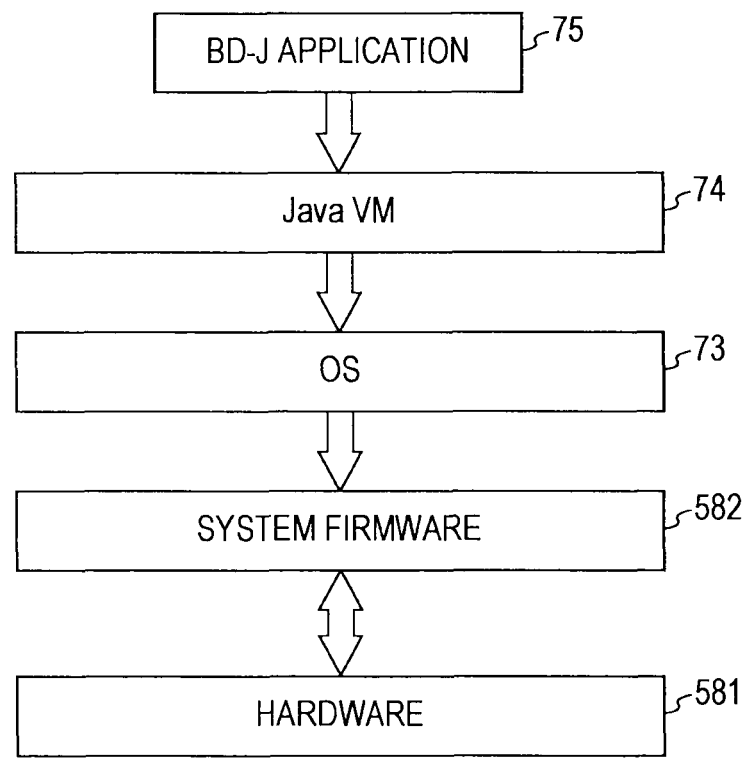
FIG. 22 is a diagram illustrating an example of a function configuration of the playing device when executing a BD-J object.

FIG. 22 is a diagram illustrating a functional configuration example of the playing device 510 when executing a BD-J object.

Of the configurations shown in FIG. 22, configurations the same as the configurations in FIG. 7 are denoted with the same reference numerals. Redundant description will be omitted as appropriate.

The configuration in FIG. 22 primarily differs from the configuration in FIG. 7 with regard to the point that hardware 581 and system firmware 582 are provided instead of the hardware 581 and system firmware 72.

The hardware 581 corresponds to the input unit 21, playing unit 512, storage unit 24, and so forth. Also, the system firmware 582, OS 73, Java (registered trademark) VM 74, and BD-J application 75 correspond to the control unit 511.

Upon a disc 501 being mounted to the hardware 581, the system firmware 582 controls the hardware 581 so as to read out the index file from the disc 501 in FIG. 7. The system firmware 582 then stores the index file in the hardware 581.

Also, in the same way as with the system firmware 72, the system firmware 582 reads out the index file from the hardware 581, and recognizes an object type and No. corresponding to a title No. to be processed, that is described within the index file. In the example in FIG. 22, the type of this object is a BD-J object.

In the same way as with the system firmware 72, the system firmware 582 controls the hardware 581 based on the No. of the BD-J object corresponding to the title No. to be processed, so as to read out the BD-J object to be processed from the disc 501, which is then stored in the hardware 581. After recognizing the BD-J application 75 to be executed based on that BD-J object, the system firmware 582 activates the Java (registered trademark) VM 74, in the same way as with the system firmware 72. The system firmware 582 then loads the BD-J application 75 to the Java (registered trademark) VM 74, in the same way as with the system firmware 72. Note that an arrangement may be made wherein the Java (registered trademark) VM 74 is activated in the time between after the disc 501 being mounted to the hardware 581 up to the BD-J application 75 to be executed being recognized.

Also, in the same way as with the system firmware 72, the system firmware 582 controls the hardware 581 in response to a playlist readout function call-up from the OS 73 corresponding to a playlist readout API call-up by the BD-J application 75 so as to read out the playlist file from the disc 501 and store it.

Further, the system firmware 582 controls the hardware 581 reads out the offset file from the disc 501 based on the reference file information described in the playlist file stored in the hardware 581. the system firmware 582 searches for offset information corresponding to the playing point-in-time of the caption data and menu data to be played, from the "offset_metadata ( )" in that offset file. The system firmware 582 supplies the offset information of the caption data and offset information of the menu data that have been searched, to the hardware 581.

[Processing of Playing Device]

Figure 23:
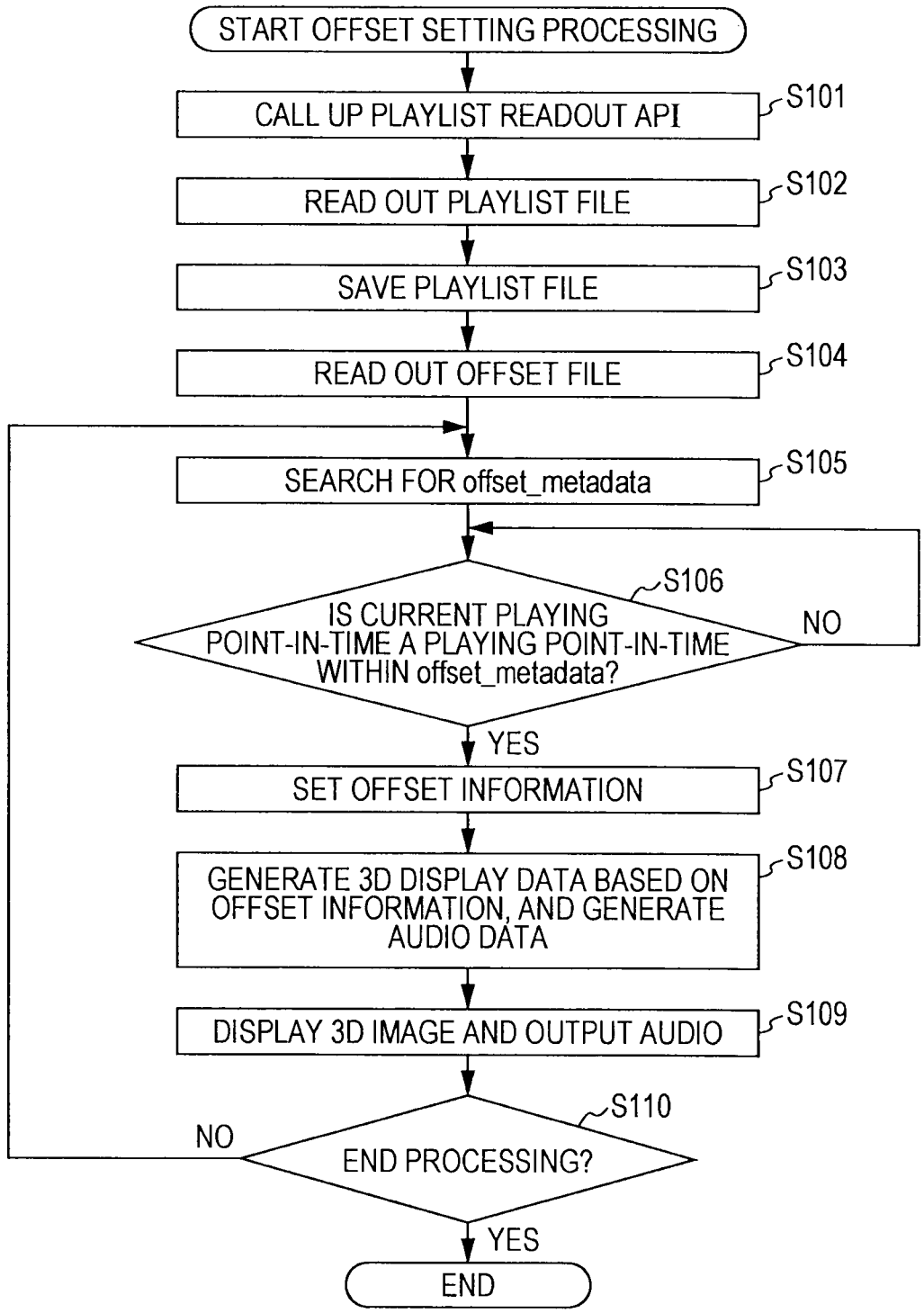
FIG. 23 is a flowchart for describing offset setting processing with the playing device when executing a BD-J object.

FIG. 23 is a flowchart describing offset setting processing by the playing device 510 at the time of executing a BD-J object. This offset setting processing is started when the system firmware 582 loads the BD-J application 75 which sets the offset information to the Java (registered trademark) VM 74, for example.

The processing of steps S101 through S103 in FIG. 23 is the same as the processing of steps S31 through S33 in FIG. 8, so description thereof will be omitted.

In step S104, the system firmware 582 controls the hardware 71 based on the reference file information described in the playlist file saved in the hardware 71, and reads out the offset file from the disc 501. The system firmware 582 then saves the offset file that has been read out, in the hardware 71.

In step S105, the system firmware 582 searches for the "offset_metadata" to be played from the offset file that has been saved, in the same way as the processing in step S34 in FIG. 8.

In step S106, determination is made by the system firmware 582 regarding whether or not the current playing point-in-time is the playing point-in-time indicated by the "offset_pts" within the "offset_metadata" searched in step S105. In the event that determination is made in step S106 that the current playing point-in-time is not the playing point-in-time indicated by the "offset_pts" within the "offset_metadata" that has been searched, the flow stands by until the current playing point-in-time is the playing point-in-time indicated by the "offset_pts" within the "offset_metadata" that has been searched.

On the other hand, in the event that determination is made in step S106 that the current playing point-in-time is the playing point-in-time indicated by the "offset_pts" within the "offset_metadata" that has been searched, the system firmware 582 supplies offset information represented by the "offset_flag" and "offset_value" of the menu data and caption data described correlated to the current playing point-in-time to the hardware 581.

Then, in step S107, the hardware 581 sets the offset information regarding the menu data from the system firmware 582 as the offset information for menu data of the current playing point-in-time, and sets the offset information regarding the caption data as the offset information for caption data of the current playing point-in-time.

The processing of steps S108 through S110 is the same as the processing of steps S37 through S39 in FIG. 8, so description thereof will be omitted.

Note that in the fourth embodiment, the "offset_metadata ( )" shown in FIG. 5 is recorded in the disc 501 as an offset file, but the "offset_metadata ( )" shown in FIG. 10 or FIG. 14 may be recorded in the disc 501 as an offset file. In this case, the reference file information is described within the playlist file, or is specified by an API. The playing device 510 reads out the offset file based on that reference file information, and sets the offset information based on the "offset_metadata ( )" of the offset file in the same way as with the second embodiment and third embodiment.

Fifth Embodiment

Configuration Example of Video Data

Figure 24:
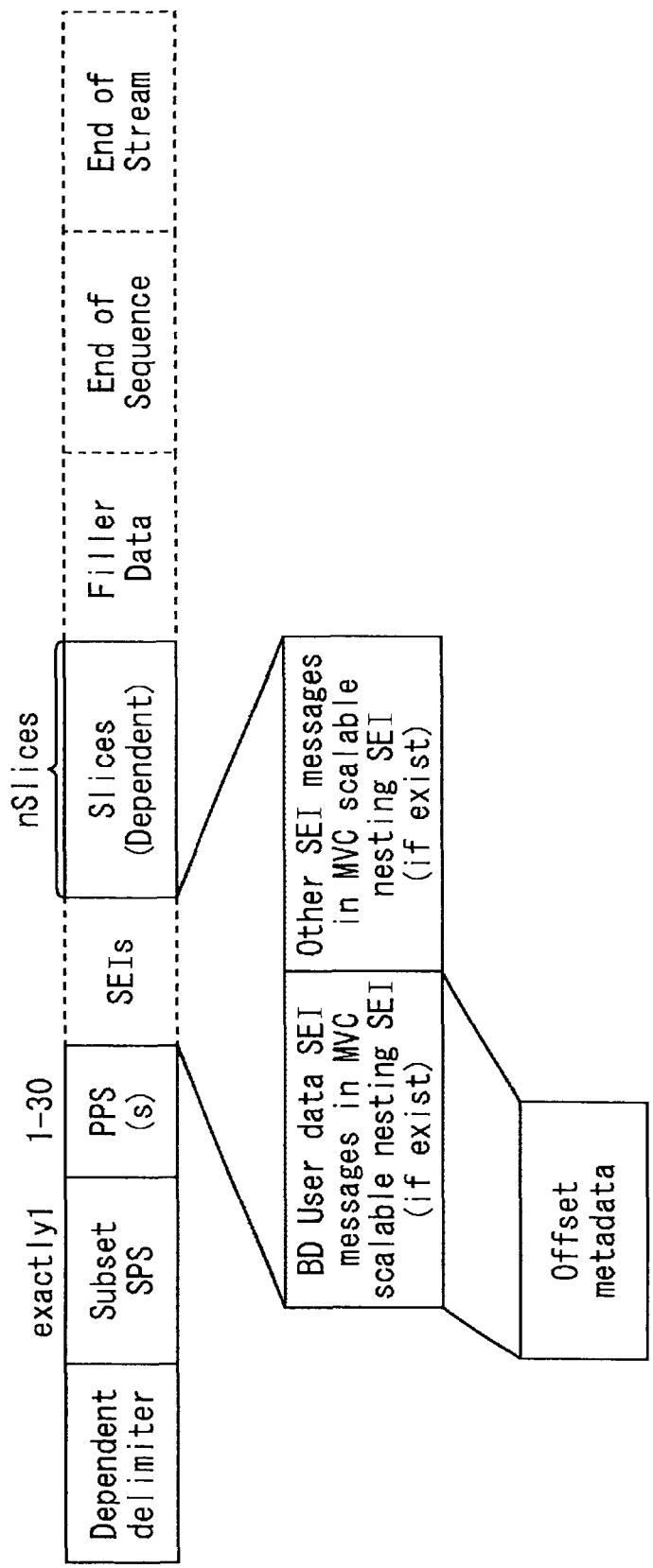
FIG. 24 is a diagram illustrating a configuration example of video data recorded in a disc according to a fifth embodiment to which the present invention has been applied.

FIG. 24 is a diagram illustrating a configuration example of video data recorded in a disc according to a firth embodiment to which the present invention has been applied.

Note that the disc according to the fifth embodiment has recorded therein video data for the right eye and video data for the left eye that has been encoded conforming to the MVC method or the like, as video data, in the same way as with disc 501.

FIG. 24 is a diagram illustrating a configuration example of the first dependent unit (picture) in display order within each GOP (Group of Picture) of video data for the right eye, which is a dependent stream encoded with the MVC method.

As shown in FIG. 24, situated in the first dependent unit in display order within each GOP of video data for the right eye are, in order from the beginning, a dependent delimiter (Dependent delimiter), Subset SPS (Sequence Parameter Set), PPS (Picture Parameter Set). SEI (Supplemental Enhancement Information), and one or more slice (Slice).

A dependent delimiter is starting code indicating the head of a dependent unit. A dependent delimiter includes, for example, information indicating the type of slices included in the dependent unit.

A Subset SPS is a header in which is included information relating to the entire sequence. A Subset SPS includes, for example, information indicating the profile of video data for the right eye, and information indicating the level of video data for the right eye. Also, for example, the Subset SPS includes information necessary for calculating a POC (Picture Order Count). A POC is information indicating the display order of pictures.

A PPS is a header in which is included information relating to pictures. For example, a PPS includes information necessary of calculating a POC.

A SEI is information indicating additional information which is not indispensable for decoding of the VCL (Video Coding Layer). A SEI can be classified into user SEI information which is information which the user who is the creator of the disc defines on his/her own (BD User data SEI messages in MVC scalable nesting SEI) and other information (Other SEI messages in MVC scalable nesting SEI). With the disc according to the fifth embodiment, at least the later-described "offset_metadata ( )" is described as user SEI information. A slice is video data of a main image for the right eye encoded with the MVC method, and is the actual data of a picture.

After one or more slices, filler data (Filler Data), end of sequence (End of Sequence), and end of stream (End of Stream) are situated as necessary.

Filler data is data added to adjust the data size. End of sequence is information representing the end of the sequence. End of stream is information representing the end of the video data for the right eye.

Note that while description is made here with the video data for the right eye being the dependent stream encoded with the MVC method and the video data for the left eye is the base stream, but an arrangement may be made wherein the video data for the right eye is the base stream, and the video data for the left eye is the dependent stream.

Also, "offset_metadata ( )" may be described as information other than user SEI information of a SEI, rather than being described as user SEI information of the dependent stream. Further, "offset_metadata ( )" may be described as a SEI of the base stream.

Description Example of "Offset_Metadata ( )"

FIG. 25 is a diagram illustrating a description example of "offset_metadata ( )" described as user SEI information in FIG. 24.

As shown in FIG. 25, an offset information database is described in "offset_metadata ( )".

Specifically, as shown in A in FIG. 25, in "offset_metadata ( )" is described the frame rate (frame_rate) of video data for the right eye in which the "offset_metadata ( )" is included, and the PTS (offset_start_PTS) of the head picture in display order in the video data for the right eye is described. The playing point-in-time of offset screens can be identified by the frame rate and PTS. Also, as shown in A in FIG. 25, described in the "offset_metadata ( )" is the number of frames (number_of_frames) of the GOP regarding which the "offset_metadata ( )" is included in the SEI. Further, as shown in A in FIG. 25, described in the "offset_metadata ( )" are the number of types of offset information for caption (number_of_PG_offset_sequence) set as to that GOP and the number of types of offset information for menu buttons (number_of_IG_offset_sequence) set as to that GOP. The type of offset information set at the time of playing the video data is specified by the playlist file and so forth.

Also, as shown in A in FIG. 25, described in "offset_metadata ( )" is offset information (PG_offset_sequence) for each type of caption offset information, and offset information (IG_offset_sequence) for each type of menu button offset information. Information indicating the offset direction (offset_direction_flag) and information indicating the offset value (offset_value), set in the offset screen, are described as the offset information (PG_offset_sequence, IG_offset_sequence), as shown in B in FIG. 25 and C in FIG. 25.

Configuration Example of Playing Device

Figure 26:
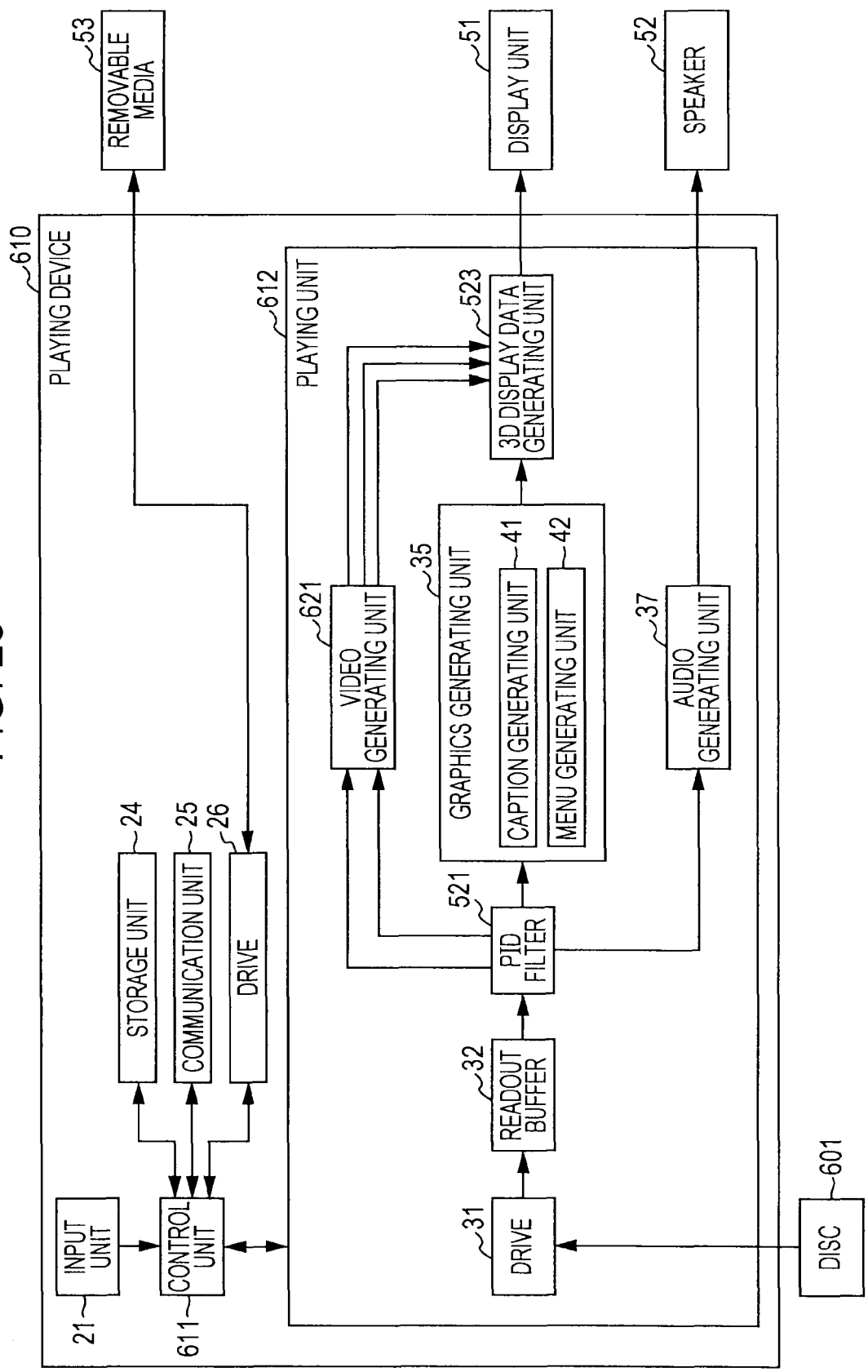
FIG. 26 is a block diagram illustrating a configuration example of a playing device for playing a disc in which is recorded the video data in FIG. 24.

FIG. 26 is a block diagram illustrating a configuration example of a playing device 610 for playing a disc 601 in which the above-described video data for the right eye is recorded.

Of the configurations shown in FIG. 26, configurations the same as the configurations in FIG. 20 are denoted with the same reference numerals. Redundant description will be omitted as appropriate.

The configuration of the playing device 610 in FIG. 26 primarily differs from the configuration of the playing device 510 in FIG. 20 with regard to the point that a control unit 611 is provided instead of the control unit 511, and the point that a playing unit 612 is provided instead of the playing unit 512.

The control unit 611 controls the playing unit 612 in accordance with instructions from the input unit 21 by executing a predetermined program. For example, in the same way as with the control unit 511 in FIG. 20, the control unit 611 reads out a playlist file recorded in the disc 601 in accordance with an instruction for 3D playing of the disc 601 from the input unit 21, and holds this in the storage unit 24. The control unit 611 supplies type information, which is information specifying the type of offset information for the caption data and menu data to be played, described in the playlist file.

The configuration of the playing unit 612 in FIG. 26 primarily differs from the configuration of the playing unit 512 in FIG. 20 with regard to the point that a video generating unit 621 is provided instead of the video generating unit 522.

In the same way as with the video generating unit 522 in FIG. 20, the video generating unit 621 decodes the PES packets of video data for the left eye and for the right eye extracted by the PID filter 521, and supplies video data for the left eye and for the right eye obtained as the result thereof to the 3D display data generating unit 523. Also, the video generating unit 621 searches for offset information for the caption data and menu data corresponding to the current playing point-in-time, based on the frame rate and PTS within the "offset_metadata ( )" included in the user SEI information obtained as a result of decoding, and the type information from the control unit 611, and supplies to the 3D display data generating unit 36.

Functional Configuration Example of Playing Device

Figure 27:
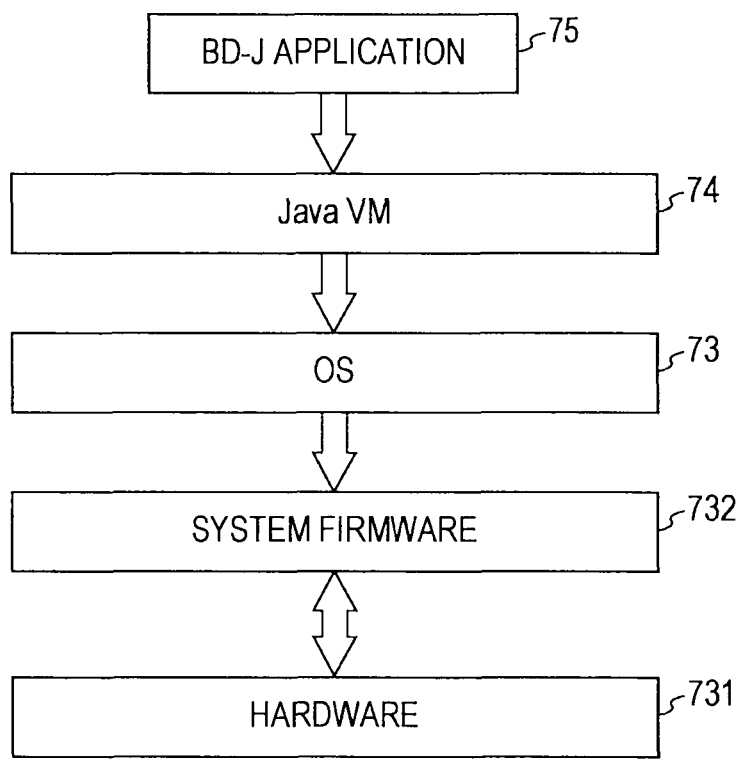
FIG. 27 is a diagram illustrating an example of a function configuration of the playing device when executing a BD-J object.

FIG. 27 is a diagram illustrating a functional configuration example of the playing device 610 when executing a BD-J object.

Of the configurations shown in FIG. 27, configurations the same as the configurations in FIG. 22 are denoted with the same reference numerals. Redundant description will be omitted as appropriate.

The configuration in FIG. 27 primarily differs from the configuration in FIG. 22 with regard to the point that hardware 731 and system firmware 732 are provided instead of the hardware 581 and system firmware 582.

The hardware 731 corresponds to the input unit 21, playing unit 612, storage unit 24, and so forth. Also, the system firmware 732, OS 73, Java (registered trademark) VM 74, and BD-J application 75 correspond to the control unit 611.

AS with the system firmware 72 in FIG. 7, upon a disc 601 being mounted to the hardware 731, the system firmware 732 controls the hardware 731 so as to read out the index file from the disc 601. The system firmware 732 then stores the index file in the hardware 731.

Also, in the same way as with the system firmware 72, the system firmware 732 reads out the index file from the hardware 731, and recognizes an object type and No. corresponding to a title No. to be processed, that is described within the index file. In the example in FIG. 27, the type of this object is a BD-J object.

In the same way as with the system firmware 72, the system firmware 732 controls the hardware 731 based on the No. of the BD-J object corresponding to the title No. to be processed, so as to read out the BD-J object to be processed from the disc 601, which is then stored in the hardware 731. After recognizing the BD-J application 75 to be executed based on that BD-J object, the system firmware 732 activates the Java (registered trademark) VM 74, in the same way as with the system firmware 72. The system firmware 732 then loads the BD-J application 75 to the Java (registered trademark) VM 74, in the same way as with the system firmware 72. Note that an arrangement may be made wherein the Java (registered trademark) VM 74 is activated in the time between after the disc 601 being mounted to the hardware 731 up to the BD-J application 75 to be executed being recognized.

Also, in the same way as with the system firmware 72, the system firmware 732 controls the hardware 731 in response to a playlist readout function call-up from the OS 73 corresponding to a playlist readout API call-up by the BD-J application 75 so as to read out the playlist file from the disc 601 and store it. The system firmware 732 supplies the type information of the caption data and menu data to be played, described in the playlist file, to the hardware 731.

[Processing of Playing Device]

Figure 28:
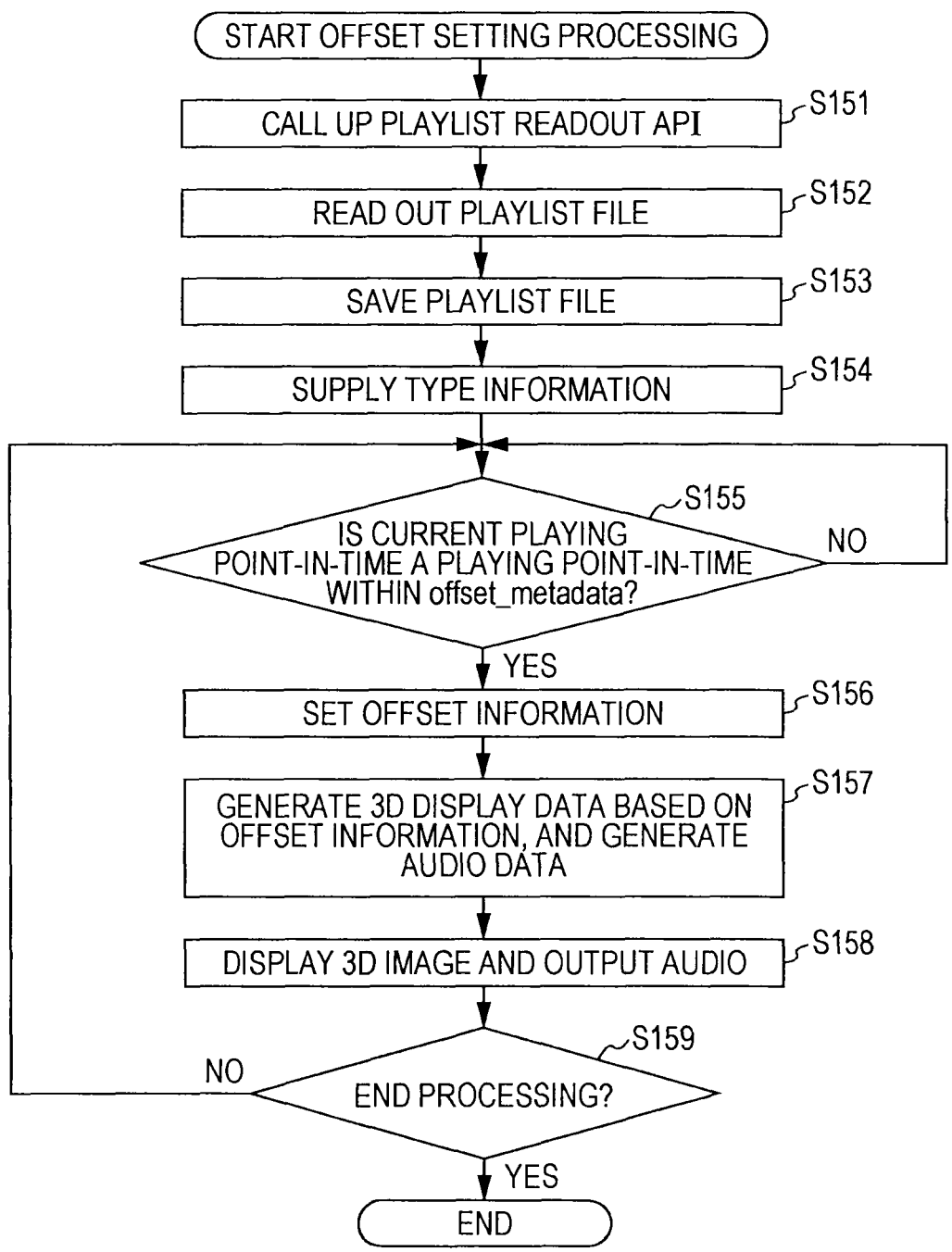
FIG. 28 is a flowchart for describing offset setting processing with the playing device when executing a BD-J object.

FIG. 28 is a flowchart describing offset setting processing by the playing device 610 at the time of executing a BD-J object. This offset setting processing is started when the system firmware 732 loads the BD-J application 75 which sets the offset information to the Java (registered trademark) VM 74, for example.

The processing of steps S151 through S153 in FIG. 28 is the same as the processing of steps S31 through S33 in FIG. 8, so description thereof will be omitted.

After the processing of step S153, in step S154 the system firmware 732 reads out the type information of the caption data and menu data to be played from the playlist file saved in the hardware 731, and supplies this to the hardware 731.

In step S155, determination is made by the hardware 731 regarding whether or not the current playing point-in-time is the playing point-in-time of the offset screen identified by the PTS and the frame rate within the "offset_metadata" included in the video data for the right eye to be played. In the event that determination is made in step S155 that the current playing point-in-time is not the playing point-in-time of the offset screen, the flow stands by until the current playing point-in-time is the playing point-in-time of the offset screen.

In the event that determination is made in step S155 that the current playing point-in-time is the of the offset screen, the flow advances to step S156. In step S156, the hardware 731 sets the offset information for menu data corresponding to the playing point-in-time and the type information from the system firmware 732 as the offset information for the menu data of the current playing point-in-time, and sets the offset information for caption data corresponding to the type information as the offset information for the caption data of the current playing point-in-time. The flow then advances to step S157.

The processing of steps S157 through S159 is the same as the processing of steps S37 through S39 in FIG. 8, so description thereof will be omitted.

Sixth Embodiment

Configuration Example of Playing Device

Figure 29:
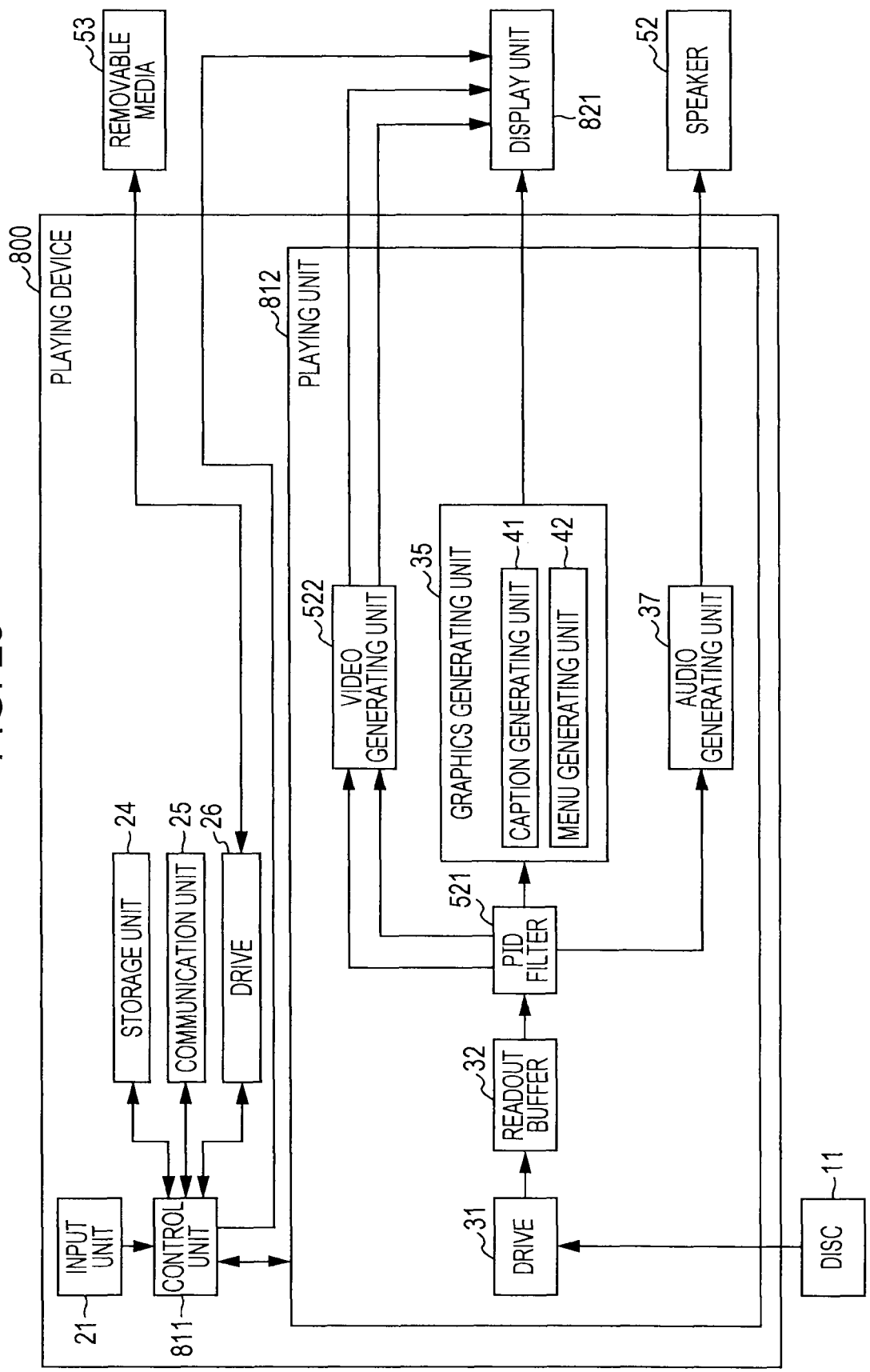
FIG. 29 is a block diagram illustrating a configuration example of a sixth embodiment to which the present invention has been applied.

FIG. 29 is a block diagram illustrating a configuration example of a sixth embodiment of a playing device to which the present invention has been applied.

Of the configurations shown in FIG. 29, configurations the same as the configurations in FIG. 20 are denoted with the same reference numerals. Redundant description will be omitted as appropriate.

The configuration of a playing device 800 in FIG. 29 primarily differs from the configuration of the playing device 510 in FIG. 20 with regard to the point that a control unit 811 is provided instead of the control unit 511 and the point that a playing unit 812 is provided instead of the playing unit 512.

Instead of generating 3D display data, the playing device 800 supplies video data for the left eye and for the right eye, caption data, menu data, and offset information for the caption data and menu data, which serve as the basis for 3D display data, to the display unit 821, and the 3D display data is generated at the display unit 821.

Specifically, the control unit 811 of the playing device 800 controls the playing unit 812 in accordance with instructions from the input unit 21 by executing a predetermined program. For example, the control unit 811 reads out a playlist file recorded in the disc 11 in accordance with an instruction from the input unit 21, and holds this in the storage unit. to perform 3D playing of the disc 11.

The control unit 811 also searches for offset information corresponding to the playing point-in-time of the caption data and menu data to be played, from the "offset_metadata ( )" within the playlist file held in the storage unit 24. The control unit 811 then supplies the offset information of the caption data and the offset information of the menu data obtained as a result of the search to the display unit 821.

The configuration of the playing unit 812 primarily differs from the configuration of the playing unit 512 in FIG. 20 with regard to the point that a 3D display data generating unit 523 is not provided.

The video data for the left eye and for the right eye obtained by the video generating unit 522 of the playing unit 812, the caption data generated by the caption generating unit 41, and the menu data generated by the menu generating unit 42, are transmitted to the display unit 821 in a format such as HDMI (High-Definition Multimedia Interface) or the like.

In the same way as the 3D display data generating unit 523 in FIG. 20, the display unit 821 generates display data for the left eye and display data for the right eye, from the video data supplied from the video generating unit 522, and the caption data and menu data supplied from the graphics generating unit 35, based on the offset information of the caption data and the offset information of the menu data supplied from the control unit 811. the display unit 821 then performs output based on the 3D display data. As a result, the user can view a 3D image.

Note that while the playing device 800 in FIG. 29 is a playing device for playing the disc 11, the above-described playing devices for playing the other discs 201, 251, 501, and 601 may also be arranged to generate 3D display data at the display unit, rather than generating the 3D display data at their own playing devices.

<Description of 3D Display Data Generating Method>

FIG. 30 is a diagram for describing a 3D display data generating method.

As shown in A in FIG. 30, the three data of video data for the left eye, caption data for the left eye, and menu data for the left eye, are synthesized to generate the display data for the left eye, of the 3D display data. Also, as shown in B in FIG. 30, the three data of video data for the right eye, caption data for the right eye, and menu data for the right eye, are synthesized to generate the display data for the right eye. Note that the order of superimposing video data, caption data, and menu data for each eye, is, in order from the bottom, video data, caption data, and menu data.

While omitted from the drawings, the playing device 210 (260, 510, 610, 800) sets offset information each time the playing point-in-time described in the offset information database comes, as with the offset setting processing in FIG. 8, FIG. 13, FIG. 17, FIG. 23, or FIG. 28, at the time of executing movie objects as well.

Also, "playing" of caption data in the above description means to read out caption data recorded in a disc and display caption based on the caption data. Also, "playing" of menu data in the above description means, when executing a movie object, to read out menu data recorded in a disc and display menu buttons based on the menu data, and when executing a BD-J object, to generate menu data and display menu buttons based on the menu data.

While the present embodiment has been described with menu buttons being generated by a BD-J application, captions, animation, and so forth, may be generated.

Note that with the present Specification, steps describing the program stored in the recording medium include processing executed in time sequence following that order as a matter of course, but is not restricted to being processed in time sequence, and also includes processing executed in parallel or individually.

Embodiments of the present invention are not restricted to the above-described embodiments, and various modifications may be made without departing from the essence of the present invention.

REFERENCE SIGNS LIST 11 disc
20 playing device
22 control unit
31 drive
36 3D display data generating unit

The invention claimed is:

1. A recording method for causing a recording apparatus to execute the steps of:
    recording image data, which is used for 2D (2 Dimensional) display of a sub-image configured by captions or a menu button, in a recording medium;
    setting offset information configured by an offset direction and an offset value such that an L image for a left eye and an R image for a right eye do not deviate from a screen, the offset direction and the offset value representing a deviation direction and a deviation amount, respectively, of the L image and the R image, which are used for 3D display of the sub-image, with respect to the sub-image corresponding to the image data; and
    recording in the recording medium a table in which the offset information is associated with reproduction time of the sub image.

2. The recording method according to claim 1, wherein the setting further comprises setting offset information configured by the offset direction and the offset value such that the L image for the left eye and the R image for the right eye are not displayed outside the screen in the 3D display of the sub-image.

3. The recording method according to claim 1, wherein the offset direction and the offset value represent the deviation direction and the deviation amount, respectively, of the L image and the R image within a respective 2D plane of the L image and the R image.

* * * * *